United States Patent
Ko et al.

(10) Patent No.: US 8,472,539 B2
(45) Date of Patent: Jun. 25, 2013

(54) METHOD OF TRANSMITTING POWER INFORMATION IN WIRELESS COMMUNICATION SYSTEM

(75) Inventors: Hyunsoo Ko, Anyang-si (KR); Moon Il Lee, Anyang-si (KR); Jae Hoon Chung, Anyang-si (KR); Bin Chul Ihm, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 12/754,755

(22) Filed: Apr. 6, 2010

(65) Prior Publication Data

US 2010/0254471 A1    Oct. 7, 2010

Related U.S. Application Data

(60) Provisional application No. 61/167,156, filed on Apr. 7, 2009.

(30) Foreign Application Priority Data

Dec. 8, 2009 (KR) .................. 10-2009-0121178

(51) Int. Cl.
*H04L 27/28* (2006.01)
(52) U.S. Cl.
USPC .......................... 375/260; 375/295

(58) Field of Classification Search
USPC .................................. 375/260, 295
See application file for complete search history.

(56) References Cited

U.S. PATENT DOCUMENTS

| | | | |
|---|---|---|---|
| 2009/0175371 A1* | 7/2009 | Zhang et al. | 375/260 |
| 2010/0135242 A1* | 6/2010 | Nam et al. | 370/330 |
| 2011/0007657 A1* | 1/2011 | Kazmi et al. | 370/252 |
| 2011/0274047 A1* | 11/2011 | Kwon et al. | 370/328 |

* cited by examiner

*Primary Examiner* — Shuwang Liu
*Assistant Examiner* — David Huang
(74) *Attorney, Agent, or Firm* — Morgan, Lewis & Bockius LLP

(57) ABSTRACT

A method of transmitting power information in a wireless communication system is provided. The method includes: determining energy per resource element (RE) to which a reference signal or data is mapped for downlink transmission; and transmitting power information of the reference signal and the data, wherein the reference signal comprises a channel state indication-reference signal (CSI-RS) for channel state measurement, power information of the CSI-RS is denoted by a ratio of power for a CSI-RS RE and power for a data RE of an orthogonal frequency division multiplexing (OFDM) symbol on which only data is transmitted or power for a cell-specific RS (CRS) RE used for channel state measurement and data demodulation of different OFDM symbols.

9 Claims, 27 Drawing Sheets

Antenna 0

METHOD OF TRANSMITTING POWER INFORMATION IN WIRELESS COMMUNICATION SYSTEM

CROSS-REFERENCE TO RELATED APPLICATIONS

This application claims the benefit of priority of U.S. Provisional application Ser. No. 61/167,156 filed on Apr. 7, 2009 and Korean Patent Application No. 10-2009-0121178 filed on Dec. 8, 2009 which are incorporated by reference in its entirety herein.

BACKGROUND

1. Technical Field

The present invention relates to wireless communications, and more particularly, to a method of transmitting power information in a wireless communication system.

2. Related Art

To maximize performance and communication capability of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

The spatial multiplexing is classified into single-user spatial multiplexing and multi-user spatial multiplexing. The single-user spatial multiplexing is also referred to as single user MIMO (SU-MIMO). The multi-user spatial multiplexing is also referred to as spatial division multiple access (SDMA) or multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where Ni≦min{Nt, Nr}. Each independent channel can be referred to as a spatial layer. A rank represents the number of non-zero eigen-values of the MIMO channel and can be defined as the number of spatial streams that can be multiplexed.

The wireless communication system needs to estimate an uplink channel or a downlink channel for data transmission/reception, system synchronization acquisition, channel information feedback, etc. Channel estimation is defined as a process for restoring a Tx signal by compensating for signal distortion when fading occurs due to rapid environmental changes. In general, a reference signal known to both a transmitter and a receiver is required for the channel estimation.

In downlink transmission, a base station (BS) transmits a signal by determining Tx power suitable for data transmission performed by a user equipment (UE) located in a cell edge while minimizing inter-cell interference. The BS has to report information on the determined Tx power to the UE. Tx power for a reference signal may be set differently from Tx power for a data signal, and information on the Tx power for the reference signal may be indicated to the UE. The UE may receive the reference signal and the data by using Tx power information on the reference signal. Since each antenna experiences a different channel in a multiple antenna system, a reference signal arrangement structure is designed by considering each antenna.

Accordingly, there is a need for a method of effectively transmitting information on Tx power for a reference signal and data in a reference signal arrangement structure of various configurations.

SUMMARY

The present invention provides a method of effectively transmitting power information in a wireless communication system.

According to an aspect of the present invention, a method of transmitting power information in a wireless communication system is provided. The method includes: determining energy per resource element (RE) to which a reference signal or data is mapped for downlink transmission; and transmitting power information of the reference signal and the data, wherein the reference signal comprises a channel state indication-reference signal (CSI-RS) for channel state measurement, power information of the CSI-RS is denoted by a ratio of power for a CSI-RS RE and power for a data RE of an orthogonal frequency division multiplexing (OFDM) symbol on which only data is transmitted or power for a cell-specific RS (CRS) RE used for channel state measurement and data demodulation of different OFDM symbols.

DESCRIPTION OF EXEMPLARY EMBODIMENTS

Figure 1:
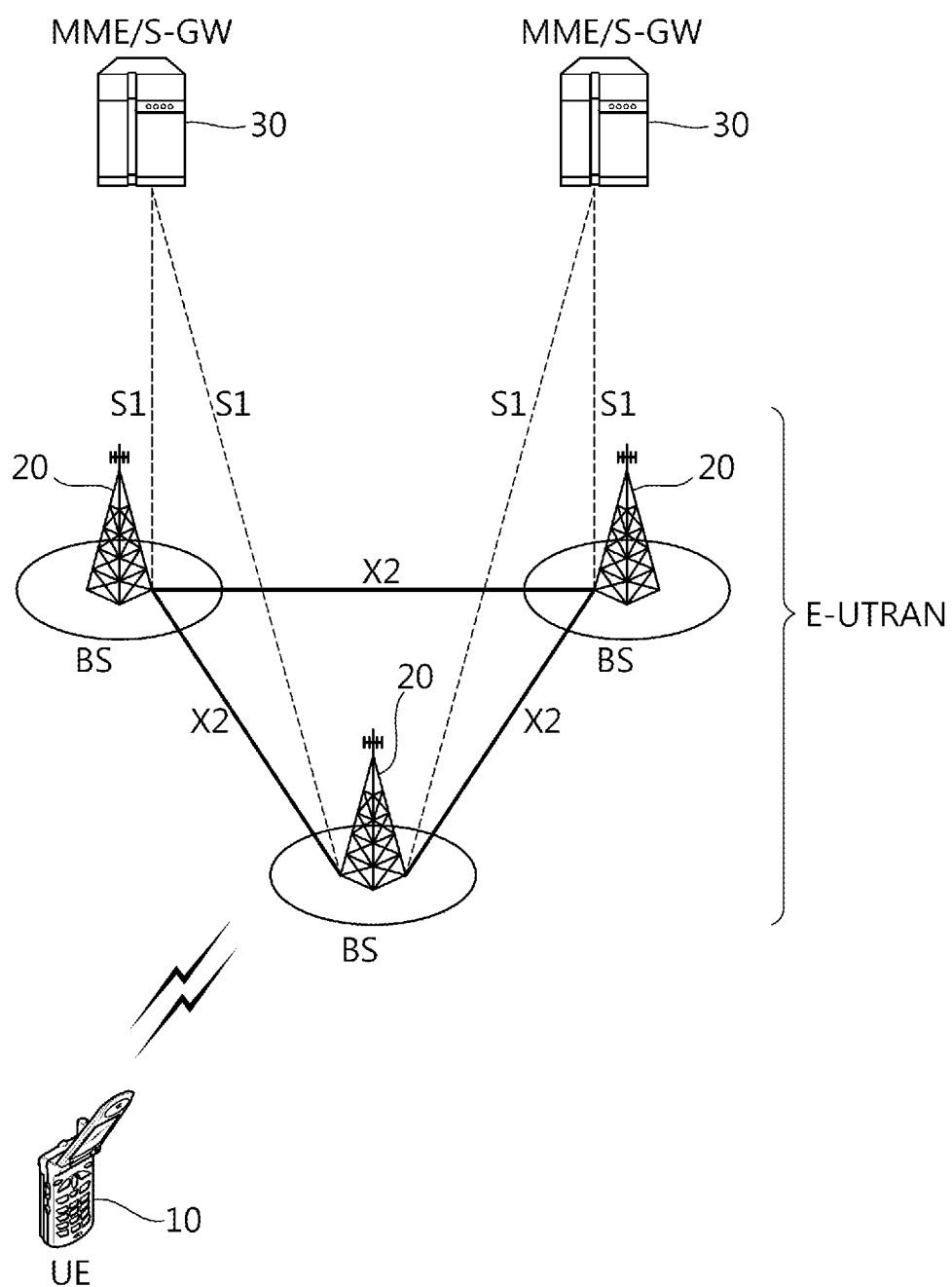
FIG. 1 shows a structure of a wireless communication system.

FIG. 1 shows a structure of a wireless communication system. The wireless communication system may have a network structure of an evolved-universal mobile telecommunications system (E-UMTS). An E-UMTS system may also be referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is an area in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. The first layer is a physical (PHY) layer. The second layer can be classified into a medium access control (MAC) layer, a radio link control (RLC) layer, and a packet data convergence protocol (PDCP) layer. The third layer is a radio resource control (RRC) layer.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality property between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. Alternatively, the multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme May be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the frequency domain, and the TSTD is a scheme in which the signals transmitted to the multiple antennas are divided in the time domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
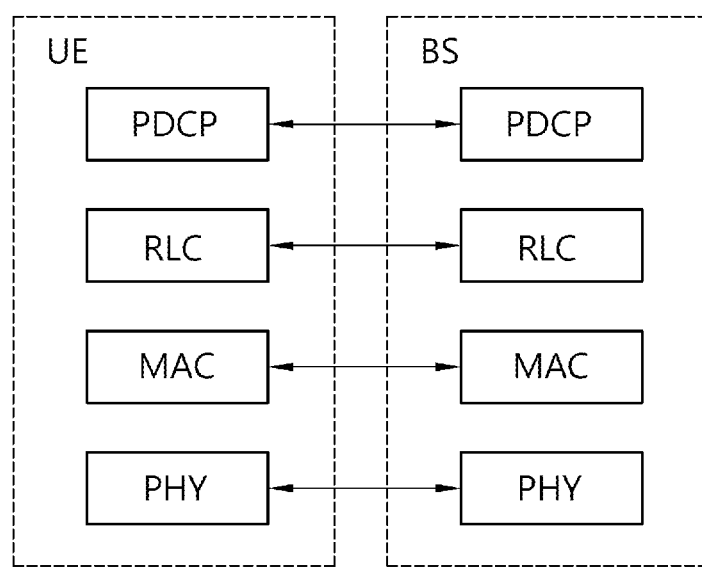
FIG. 2 is a diagram showing a radio protocol architecture for a user plane.
Figure 3:
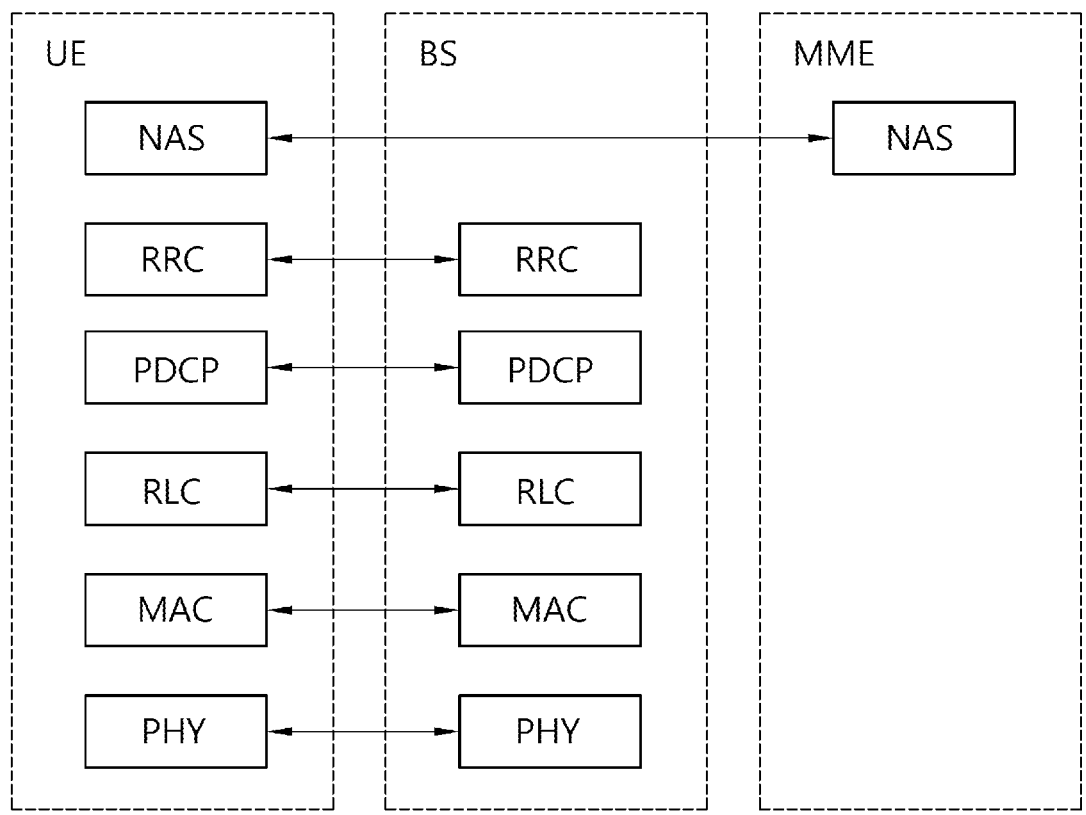
FIG. 3 is a diagram showing a radio protocol architecture for a control plane.

FIG. 2 is a diagram showing a radio protocol architecture for a user plane. FIG. 3 is a diagram showing a radio protocol architecture for a control plane. They illustrate an architecture of a radio interface protocol between a UE and an E-UTRAN. The user plane is a protocol stack for user data transmission. The control plane is a protocol stack for control signal transmission.

Referring to FIGS. 2 and 3, between different PHY layers (i.e., a PHY layer of a transmitter and a PHY layer of a receiver), data is transferred through a physical channel. The PHY layer is coupled with a MAC layer, i.e., an upper layer of the PHY layer, through a transport channel. Between the MAC layer and the PHY layer, data is transferred through the transport channel. The PHY layer provides the MAC layer and an upper layer with an information transfer service through the transport channel.

The MAC layer provides a service to an RLC layer, i.e., an upper layer of the MAC layer, through a logical channel. The RLC layer supports reliable data transmission. The PDCP layer performs a header compression function to reduce an Internet protocol (IP) packet header size.

The RRC layer is defined only in the control plane. The RRC layer controls radio resources between the UE and the network. For this, the RRC layer exchanges an RRC message between the UE and the network. The RRC layer serves to control the logical channel, the transport channel, and the physical channel in association with configuration, reconfiguration and release of radio bearers. A radio bearer is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
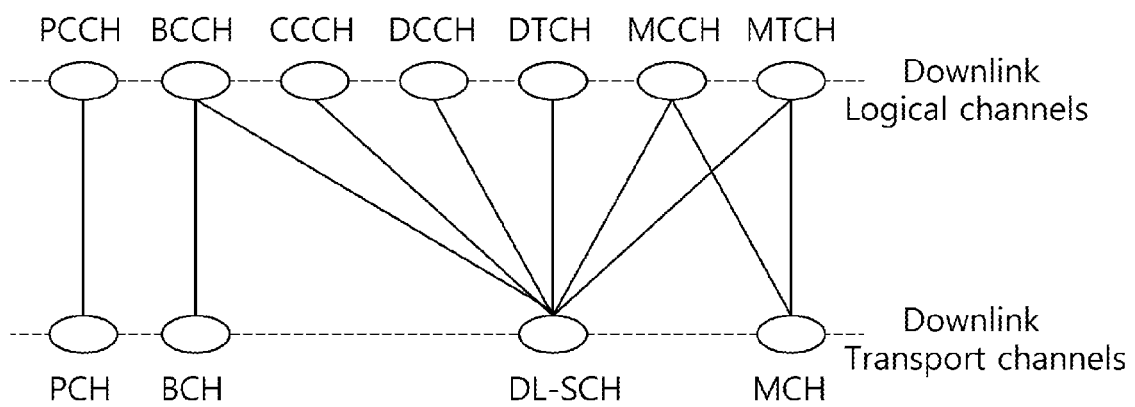
FIG. 4 shows mapping between downlink logical channels and downlink transport channels.

FIG. 4 shows mapping between downlink logical channels and downlink transport channels. The section 6.1.3.2 of 3GPP TS 36.300 V8.6.0 (2008-09) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 4, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. A logical channel is classified into two groups, i.e., a control channel and a traffic channel.

The control channel is used for the transfer of control plane information. The BCCH is a downlink control channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The DCCH is a point-to-point bi-directional channel for transmitting dedicated control information between the UE and the network, and is used by UEs having an RRC connection.

The traffic channel is used for the transfer of user plane information. The DTCH is a point-to-point channel used for the transfer of user information. The DTCH can exist in both uplink and downlink. The MTCH is a point-to-multipoint downlink channel for transmitting traffic data and is used by the UEs that receive the MBMS.

The transport channel is classified according to a mechanism of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and Tx power, possibility to be broadcast in the entire cell, and possibility to use beamforming, support for both dynamic and semi-static resource allocation, support for discontinuous reception (DRX) to enable UE power saving, and support for MBMS transmission. The PCH is characterized by support for DRX to enable UE power saving and support for broadcast in the entire coverage area of the cell. The MCH is characterized by support for broadcast in the entire coverage area of the cell and support for an MBMS single frequency network (MBSFN).

Figure 5:
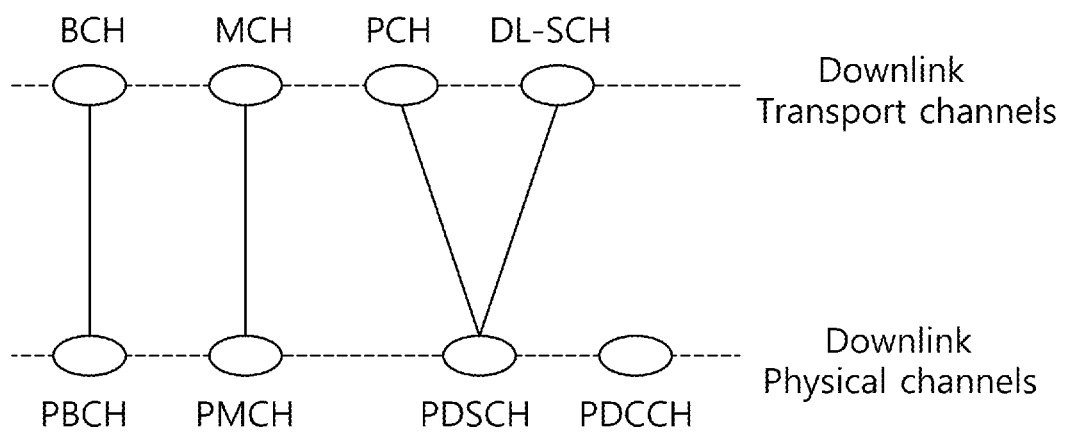
FIG. 5 shows mapping between downlink transport channels and downlink physical channels.

FIG. 5 shows mapping between downlink transport channels and downlink physical channels. The section 5.3.1 of 3GPP TS 36.300 V8.6.0 (2008-09) may be incorporated herein by reference.

Referring to FIG. 5, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries an MCH transport block. The PDSCH carries DL-SCH and PCH transport blocks.

Examples of a downlink physical control channel used in the PHY layer include a physical downlink control channel (PDCCH), a physical control format indicator channel (PCFICH), a physical hybrid ARQ indicator channel (PHICH), etc. The PDCCH informs a UE of resource assignment of the PCH and DL-SCH, and also informs the UE of HARQ information related to the DL-SCH. The PDCCH may carry an uplink (UL) scheduling grant which informs the UE of resource assignment for uplink transmission. The PCFICH informs the UE of the number of OFDM symbols used for transmission of the PDCCHs within a subframe. The PCFICH can be transmitted in every subframe. The PHICH carries HARQ acknowledgement (ACK)/negative-acknowledgement (NACK) signals in response to uplink transmission.

Figure 6:
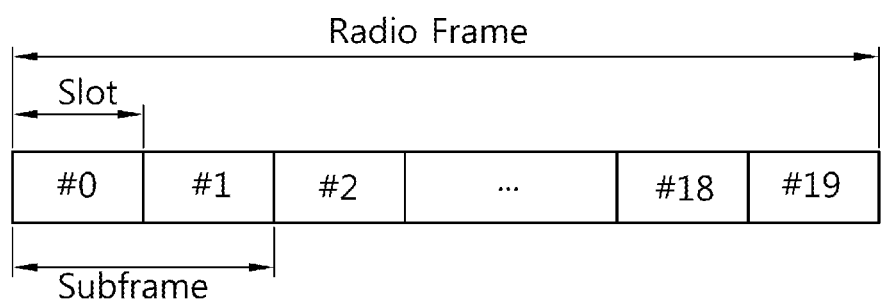
FIG. 6 shows a structure of a radio frame.

FIG. 6 shows a structure of a radio frame.

Referring to FIG. 6, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 6 is shown for exemplary purposes only. Thus, the number of subframes included in the radio frame or the number of slots included in the subframe may change variously.

Figure 7:
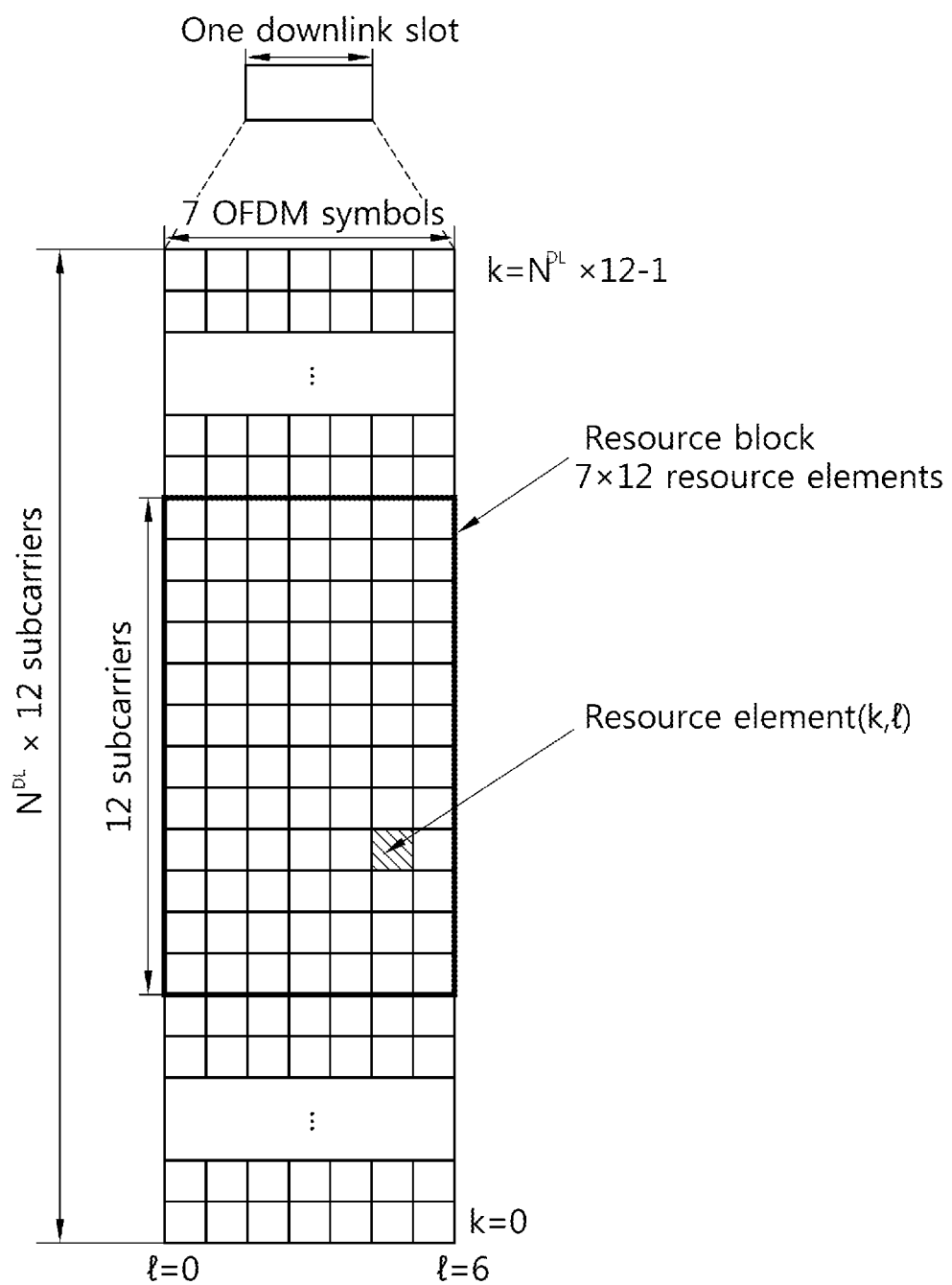
FIG. 7 shows an example of a resource grid for one downlink slot.

FIG. 7 shows an example of a resource grid for one downlink slot.

Referring to FIG. 7, the downlink slot includes a plurality of OFDM symbols in a time domain and $N^{DL}$ resource blocks (RBs) in a frequency domain. The number $N^{DL}$ of RBs included in the downlink slot depends on a downlink transmission bandwidth determined in a cell. For example, in an LTE system, $N^{DL}$ may be any one value in the range of 60 to 110. One RB includes a plurality of subcarriers in the frequency domain.

Each element on the resource grid is referred to as a resource element (RE). The RE on the resource grid can be identified by an index pair (k, l) within the slot. Herein, k (k=0, . . . , $N^{DL} \times 12-1$) denotes a subcarrier index in the frequency domain, and l (l=0, . . . , 6) denotes an OFDM symbol index in the time domain.

Although it is described herein that one RB includes 7×12 REs consisting of 7 OFDM symbols in the time domain and subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 8:
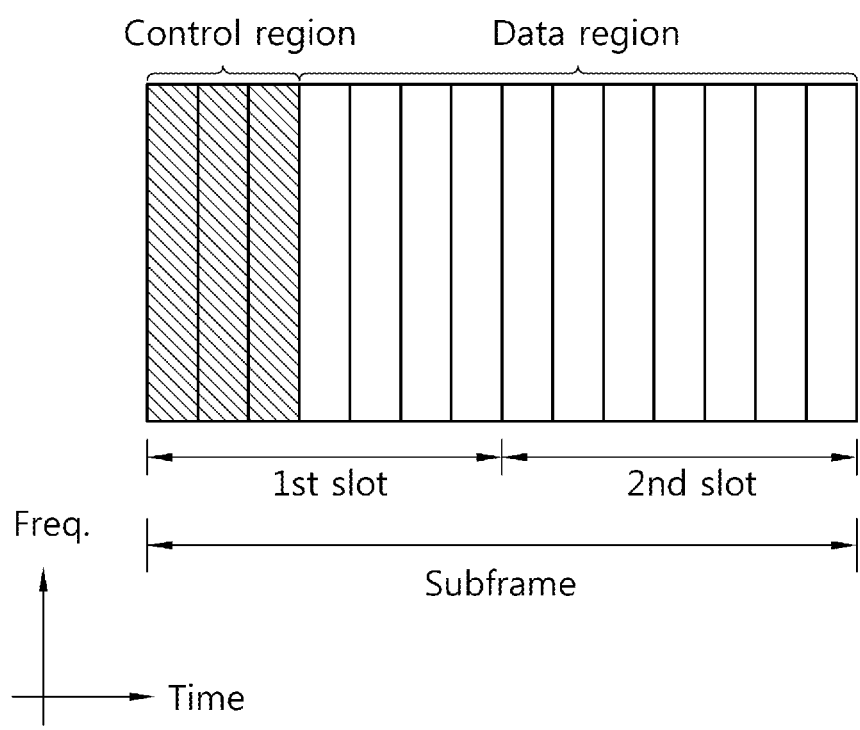
FIG. 8 shows a structure of a subframe.

FIG. 8 shows a structure of a subframe.

Referring to FIG. 8, the subframe includes two consecutive slots. First three OFDM symbols of a $1^{st}$ slot within the subframe correspond to a control region to be assigned with a PDCCH. The remaining OFDM symbols correspond to a data region to be assigned with a PDSCH. In addition to the PDCCH, control channels such as a PCFICH, a PHICH, etc., can be assigned to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH.

Hereinafter, a resource element (RE) used for reference signal (RS) transmission is referred to as a reference symbol. REs other than the reference symbol can be used for data transmission. An RE used for data transmission is referred to as a data symbol. The RS may also be referred to as a pilot.

The RS may be multiplied by a predetermined RS sequence when transmitted. For example, the RS sequence may be a pseudo-random (PN) sequence, an m-sequence, etc. The RS sequence may be a binary sequence or a complex sequence. When a BS transmits the RS multiplied by the RS sequence, a UE can reduce interference of the RS received from a neighbor cell and thus can improve channel estimation performance.

The RS can be classified into a common RS and a dedicated RS. The common RS is an RS transmitted to all UEs in a cell. The dedicated RS is an RS transmitted to a specific UE group or a specific UE in the cell. The common RS may also be referred to as a cell-specific RS. The dedicated RS may also be referred to as a UE-specific RS. The common RS may be transmitted using all downlink subframes. The dedicated RS may be transmitted using a specific resource region allocated to the UE.

The UE may Perform data demodulation and channel quality measurement by using channel information obtained from the RS. Since a radio channel has characteristics of delay spreading and frequency and time variations due to a Doppler effect, the RS has to be designed by considering a frequency and time selective channel change. Further, the RS has to be designed not to exceed a proper overhead so that data transmission is not affected by the overhead caused by RS transmission.

In an LTE system having 4 Tx antennas (i.e., 4Tx transmission), an RS defined for 4Tx is transmitted by using an SFBC-FSTD scheme for a control channel. A UE obtains channel information by using the RS and then performs demodulation. In the LTE system, first 2 or 3 OFDM symbols of a subframe consisting of consecutive 14 or 12 OFDM symbols are allocated as the control channel, and the remaining OFDM symbol of the subframe are allocated as a data channel. In particular, the control channel is transmitted using a transmit diversity scheme defined according to an antenna configuration of the BS.

First, a common RS will be described.

Figure 9:
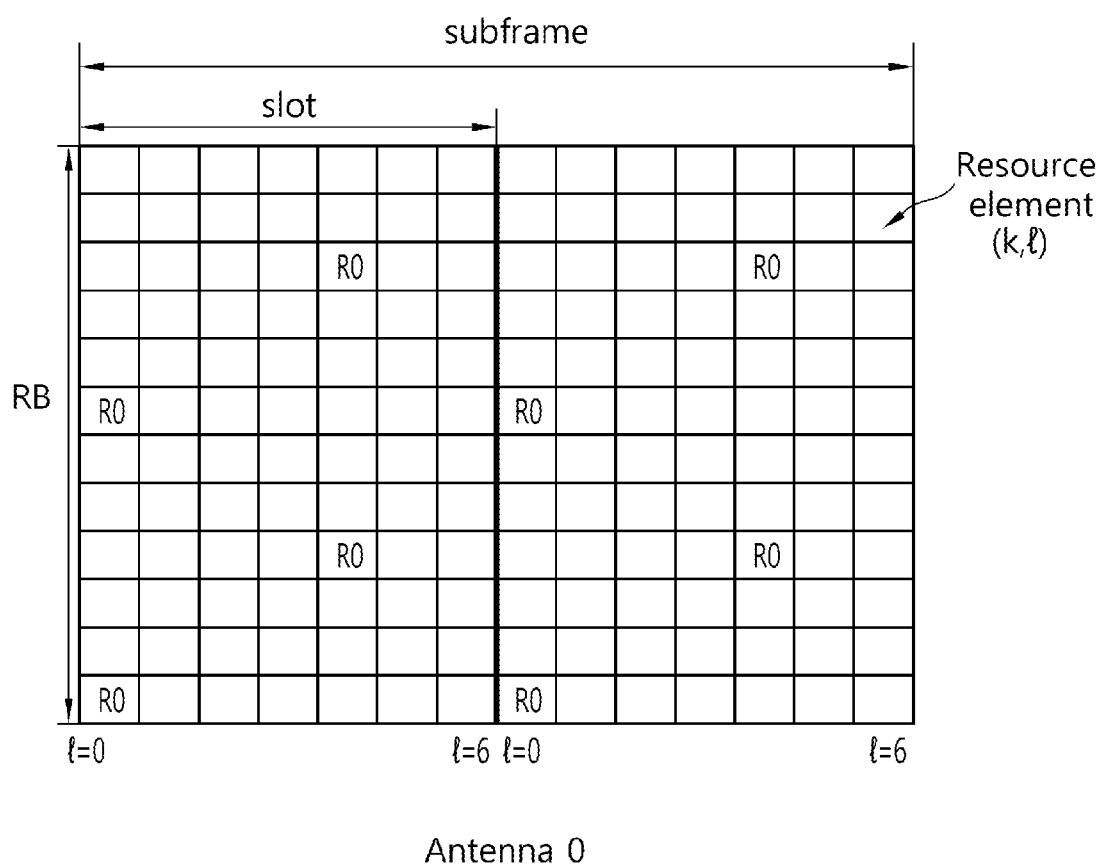
FIG. 9 shows an exemplary structure of a common reference signal (RS) for one antenna.
Figure 10:
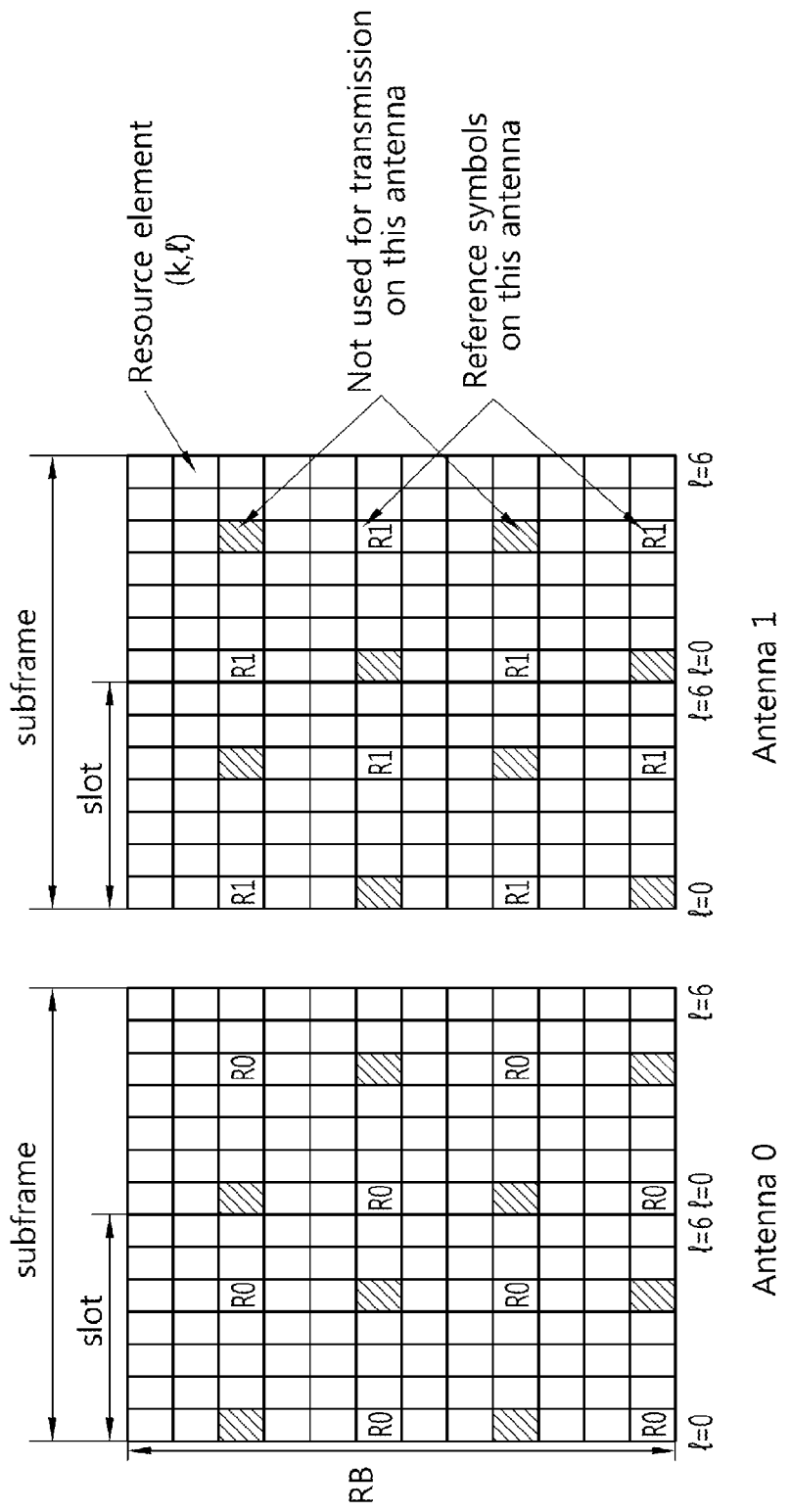
FIG. 10 shows an exemplary structure of a common RS for two antennas.
Figure 11:
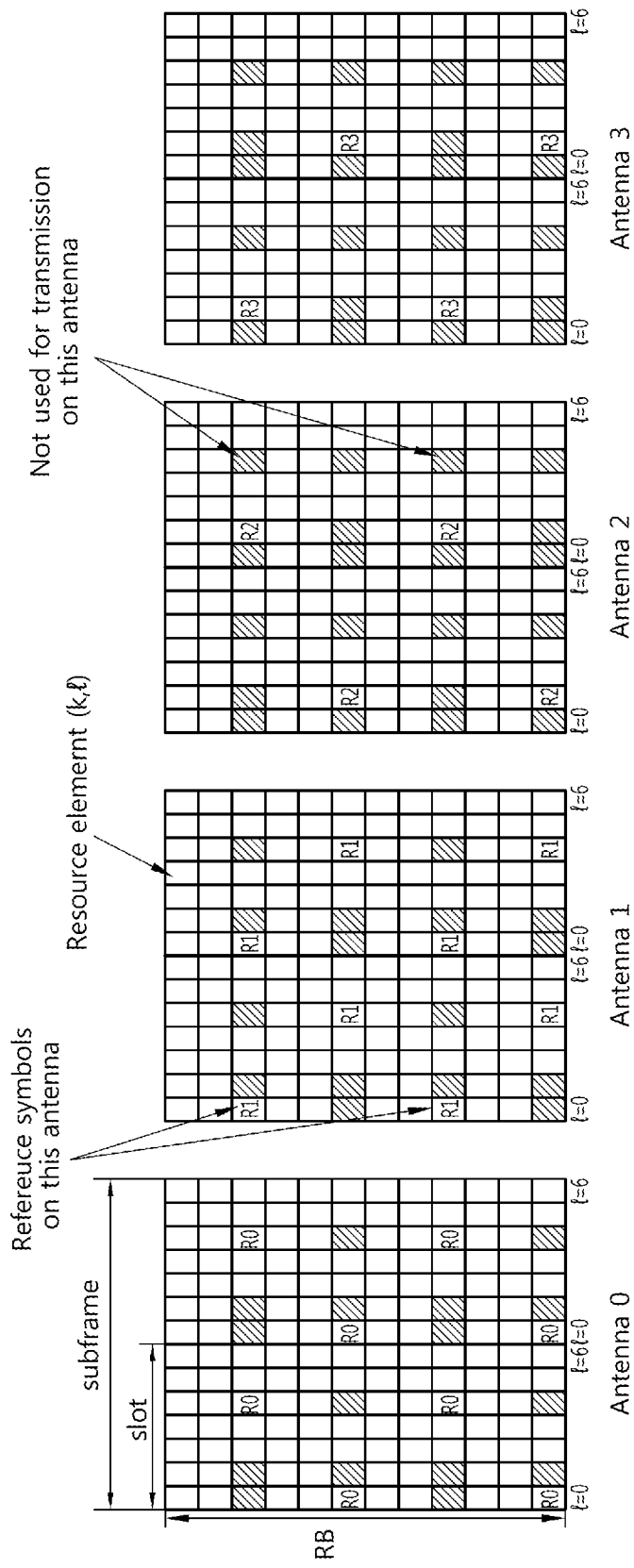
FIG. 11 shows an exemplary structure of a common RS for four antennas in a subframe when using a normal cyclic prefix (CP).
Figure 12:
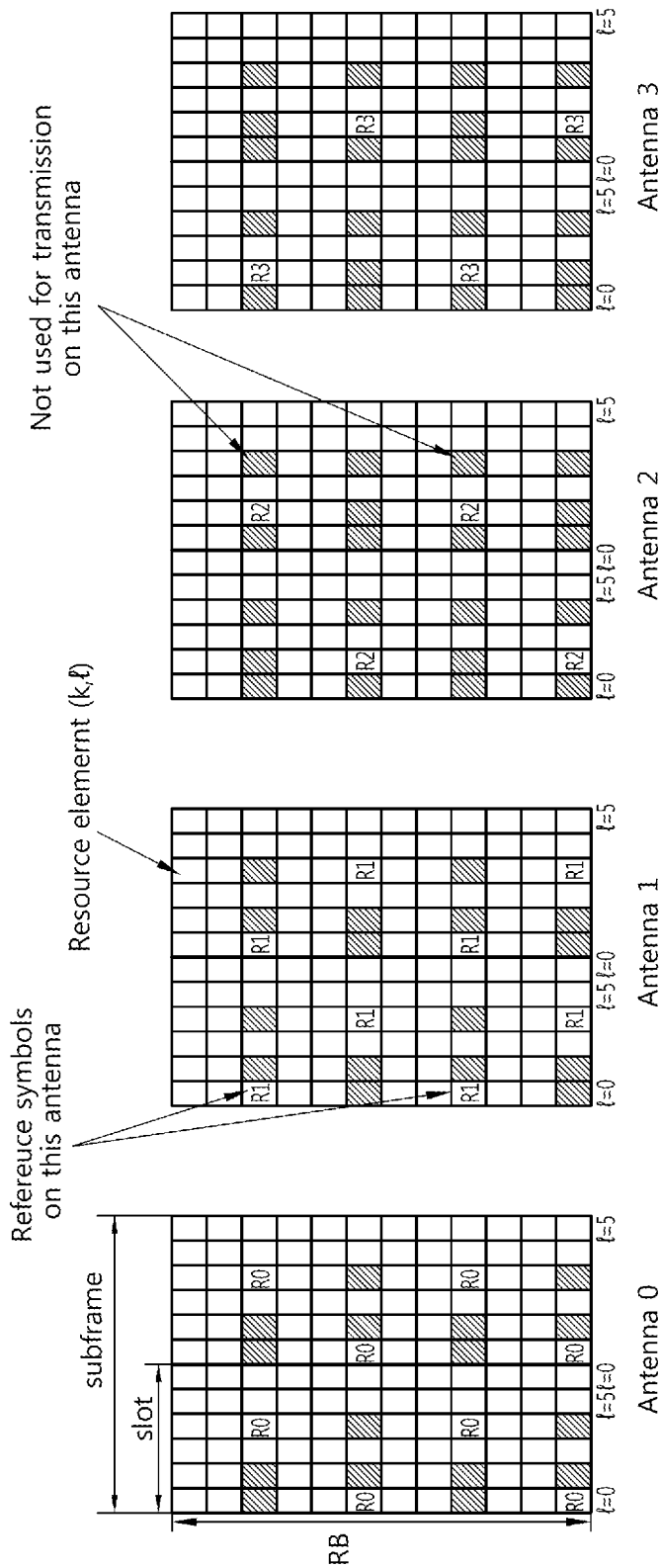
FIG. 12 shows an exemplary structure of a common RS for four antennas in a subframe when using an extended CP.

FIG. 9 shows an exemplary structure of a common RS for one antenna. FIG. 10 shows an exemplary structure of a common RS for two antennas. FIG. 11 shows an exemplary structure of a common RS for four antennas in a subframe when using a normal CP. FIG. 12 shows an exemplary structure of a common RS for four antennas in a subframe when using an extended CP. The section 6.10.1 of 3GPP TS 36.211 V8.4.0 (2008-09) Technical Specification Group Radio Access Network; Evolved Universal Terrestrial Radio Access (E-UTRA); Physical Channels and Modulation (Release 8) may be incorporated herein by reference.

Referring to FIGS. 9 to 12, in case of multiple antenna transmission using a plurality of antennas, a resource grid exists for each antenna, and at least one RS for each antenna may be mapped to the resource grid. The RS for each antenna consists of reference symbols. Rp denotes a reference symbol of an antenna #p (where p∈{0, 1, 2, 3}). R0 to R3 are not mapped to overlapping REs.

In one OFDM symbols, each Rp may be positioned with a spacing of 6 subcarriers. In a subframe, the number of R0s is equal to the number of R1s, and the number of R2s is equal to the number of R3s. In the subframe, the number of R2s and R3s is less than the number of R0s and R1s. To avoid inter-antenna interference, Rp is not used in any transmission through antennas except for the antenna #p. The number of transmitted common RSs is equal to the number of antennas irrespective of the number of streams. The common RS has an independent RS for each antenna. A frequency-domain position and a time-domain position of the common RS in the subframe are determined irrespective of the UEs. A common RS sequence to be multiplied by the common RS is generated also irrespective of the UEs. Therefore, all UEs within the cell can receive the common RS. However, a position of the common RS in the subframe and the common RS sequence may be determined according to a cell identifier (ID). Thus, the common RS is also referred to as a cell-specific RS.

More specifically, the time-domain position of the common RS in the subframe may be determined according to an antenna number and the number of OFDM symbols in a resource block. The frequency-domain position of the common RS in the subframe may be determined according to an antenna number, a cell ID, an OFDM symbol index f, a slot number in a radio frame, etc. The common RS sequence may be used in one subframe on an OFDM symbol basis. The common RS sequence may vary according to a cell ID, a slot number in one radio frame, an OFDM symbol index in a slot, a CP type, etc.

In an OFDM symbol including reference symbols, the number of reference symbols for each antenna is 2. Since a subframe includes $N^{DL}$ resource blocks in the frequency domain, the number of reference symbols for each antenna is $2 \times N^{DL}$ in one OFDM symbol. Thus, a common RS sequence has a length of $2 \times N^{DL}$.

When r(m) denotes a common RS sequence, Equation 1 shows an example of a plurality of complex sequences used as r(m).

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

Herein, $n_s$ denotes a slot number in a radio frame, and denotes an OFDM symbol number in a slot. m is 0, 1, . . . , $2N^{max,DL}-1$. $N^{max,DL}$ denotes the number of resource blocks corresponding to a maximum bandwidth. For example, in the LTE system, $N^{max,DL}$ may be 110. c(i) denotes a PN sequence, and may be defined by a gold sequence having a length of 31. Equation 2 shows an example of the sequence c(i) having a length of $2 \times N^{max,DL}$.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_1(n)) \bmod 2 \quad \text{[Equation 2]}$$

Herein, $N_c$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized according to a cell ID for each OFDM symbol, a slot number in one radio frame, an OFDM symbol index in a slot, a CP type, etc. Equation 3 shows an example of an initialized PN sequence $c_{init}$.

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} \quad \text{[Equation 3]}$$

Herein, $N_{CP}$ is 1 in case of a normal CP, and is 0 in case of an extended CP.

The generated common RS sequence is mapped to an RE. Equation 4 shows an example of mapping the common RS sequence to the RE. The common RS sequence may be mapped to complex-valued modulation symbols $a_{k,l}^{(p)}$ for an antenna p in the slot $n_s$.

$$a_{k,l}^{(p)} = r_{l,n_s}(m') \quad \text{[Equation 4]}$$

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

Herein, $v$ and $v_{shift}$ are defined by frequency-domain positions for different RSs. $v$ may be given as shown in $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 5]}$$

A cell-specific frequency shift $u_{shift}$ can be defined as shown in Equation 6.

$$v_{shift} = N_{ID}^{cell} \bmod 6 \quad \text{[Equation 6]}$$

Meanwhile, in a system having a smaller bandwidth than $N^{max,DL}$, only a certain part of the RS sequence generated in a length of $2 \times N^{max,DL}$ may be selected and used.

Now, a dedicated RS will be described.

Figure 13:
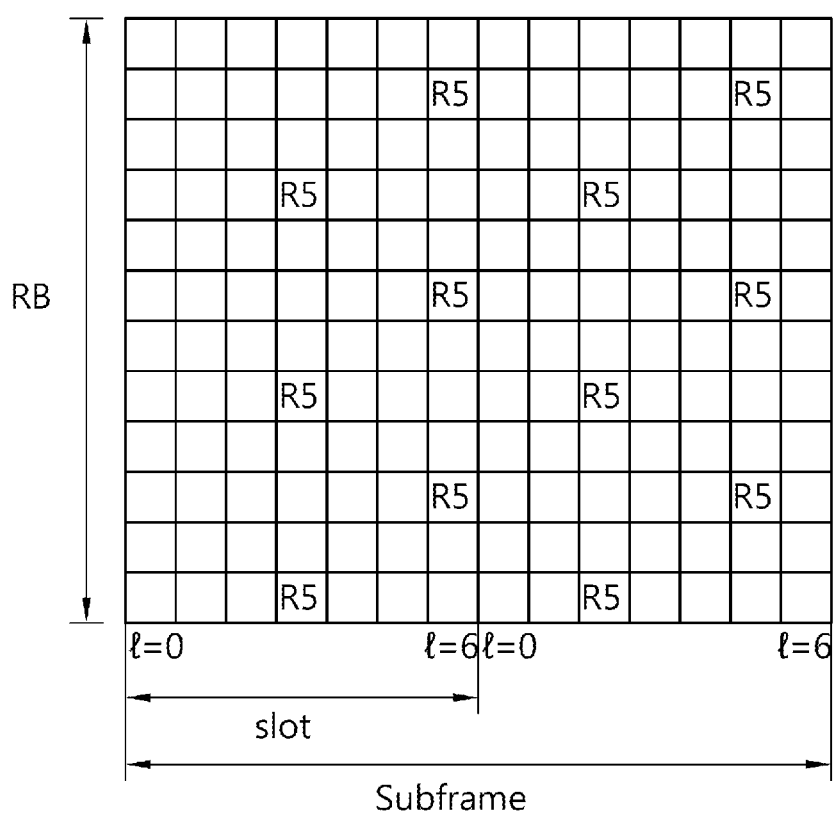
FIG. 13 shows an exemplary structure of a dedicated RS in a subframe when using a normal CP.
Figure 14:
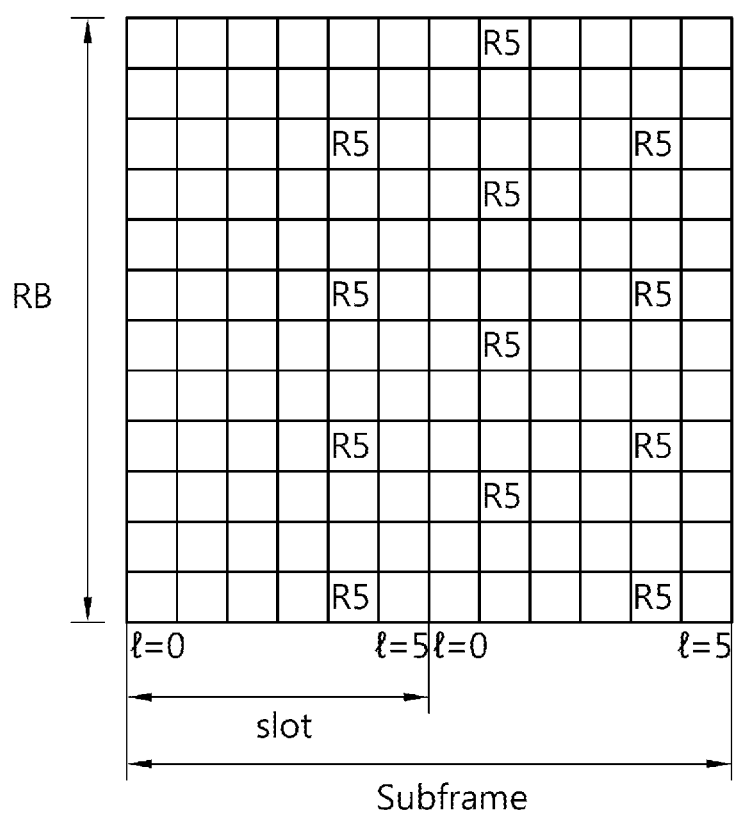
FIG. 14 shows an exemplary structure of a dedicated RS in a subframe when using an extended CP.

FIG. 13 shows an exemplary structure of a dedicated RS in a subframe when using a normal CP. FIG. 14 shows an exemplary structure of a dedicated RS in a subframe when using an extended CP.

Referring to FIGS. 13 and 14, when using the normal CP, one TTI includes 14 OFDM symbols. When using the extended CP, one TTI includes 12 OFDM symbols. Herein, RS denotes a reference symbol of an antenna #5 transmitting the dedicated RS. When using the normal CP, the reference symbol is positioned with a spacing of 4 subcarriers in one OFDM symbol including the reference symbol. When using the extended CP, the reference symbol is positioned with a spacing of 3 subcarriers in one OFDM symbol including the reference symbol.

The number of transmitted dedicated RSs is equal to the number of streams. The dedicated RS may be used when a BS transmits downlink information to a specific UE by performing beamforming on the downlink information. The dedicated RS may be included in a data region instead of a control region. The dedicated RS may be transmitted using resource block to which a PDSCH is mapped. That is, a dedicated RS for a specific UE may be transmitted through a PDSCH allocated to the specific UE.

A frequency-domain position and a time-domain position of the dedicated RS in a subframe may be determined according to a resource block allocated for PDSCH transmission. A dedicated RS sequence to be multiplied by the dedicated RS may be determined according to a UE ID. In this case, only the specific UE corresponding to the UE ID in a cell may receive the dedicated RS. Therefore, the dedicated RS is also referred to as a UE-specific RS.

More specifically, the time-domain position of the dedicated RS in the subframe may be determined according to a slot number in a radio frame and a CP type. The frequency-domain position of the dedicated RS in the subframe may be determined according to a resource block allocated for PDSCH transmission, a cell ID, an OFDM symbol index l, a CP type, etc. A dedicated RS sequence may be applied in one subframe on an OFDM symbol basis. The dedicated RS sequence may differ according to a cell ID, a subframe position in a radio frame, a UE ID, etc.

Equations 1 and 2 can be also applied in the dedicated RS sequence. In Equation 1, m is determined by $N^{PDSCH}$. $N^{PDSCH}$ denotes the number of resource blocks corresponding to a bandwidth in association with PDSCH transmission. Therefore, a length of the dedicated RS sequence may vary depending on $N^{PDSCH}$. That is, the RS sequence has a different length according to a data amount allocated to the UE. In Equation 2, the $1^{st}$ m-sequence $x_1(i)$ or the $2^{nd}$ m-sequence $x_2(i)$ may be initialized according to a cell ID for each subframe, a subframe position in one radio frame, a UE ID, etc.

The dedicated RS sequence is generated for each subframe, and may be applied on an OFDM symbol basis. The number of reference symbols is 12 in a resource region consisting of one subframe in a time domain and one resource block in a frequency domain. Since the number of resource blocks is $N^{PDSCH}$, the number of all reference symbols is $12 \times N^{PDSCH}$. Therefore, the dedicated RS sequence has a length of $12 \times N^P_{DSCH}$ when the dedicated RS sequence is generated using Equation 1, m is 0, 1, ..., $12N^{PDSCH}-1$. The dedicated RS sequences are sequentially mapped to the reference symbols. First, the dedicated RS sequences are mapped to the reference symbols in one OFDM symbol in an ascending order of a subcarrier index, and are then mapped to next OFDM symbol.

The common RS and the dedicated RS may be simultaneously used. For example, it is assumed that control information is transmitted on 3 OFDM symbols (l=0, 1, 2) of a $1^{st}$ slot in a subframe. OFDM symbols indexed with 0, 1, and 2 (l=0, 1, 2) may use the common RS. The remaining OFDM symbols other than the 3 OFDM symbols may use the dedicated RS.

A multiple antenna system in which an antenna configuration increases and a multiple carrier system using a plurality of carriers can be considered to improve spectral efficiency of a wireless communication system. The multiple carrier system requires an additional carrier band while maintaining the existing carrier band. For example, a system using the existing 20 MHz-bandwidth as one carrier has to use an additional carrier similar to the existing bandwidth while maintaining the existing service, and thus there is a limitation in the use of the frequency band.

In the multiple antenna system in which the antenna configuration increases, there is a need to design an RS structure and a transmission scheme depending on the increased antenna configuration. For example, if the antenna configuration increases from the existing 4Tx system to an 8Tx system, an RS of each antenna may be transmitted by being multiplexed in a time domain or a frequency domain or a code domain to identify channels of eight Tx antennas. Further, when the transmission method is considered, transmission has to be performed with the same Tx power on average in the eight Tx antennas.

If a multiple antenna system using N Tx antennas is referred to as a legacy system, a multiple antenna system using N+1 or more Tx antennas is referred to as an evolved system (where N is integer satisfying N>1). For example, the 4Tx system using up to four Tx antennas such as the LTE system may be referred to as the legacy system, and the 8Tx system using the eight Tx antennas may be referred to as the evolved system. A UE using the legacy system is referred to as a legacy UE, and a UE using the evolved system is referred to as an evolved UE. The evolved system must be able to support the evolved UE while supporting the legacy UE. This is called backward compatibility. It is assumed hereinafter that the legacy system is the 4Tx system and the evolved system is the 8Tx system.

Figure 15:
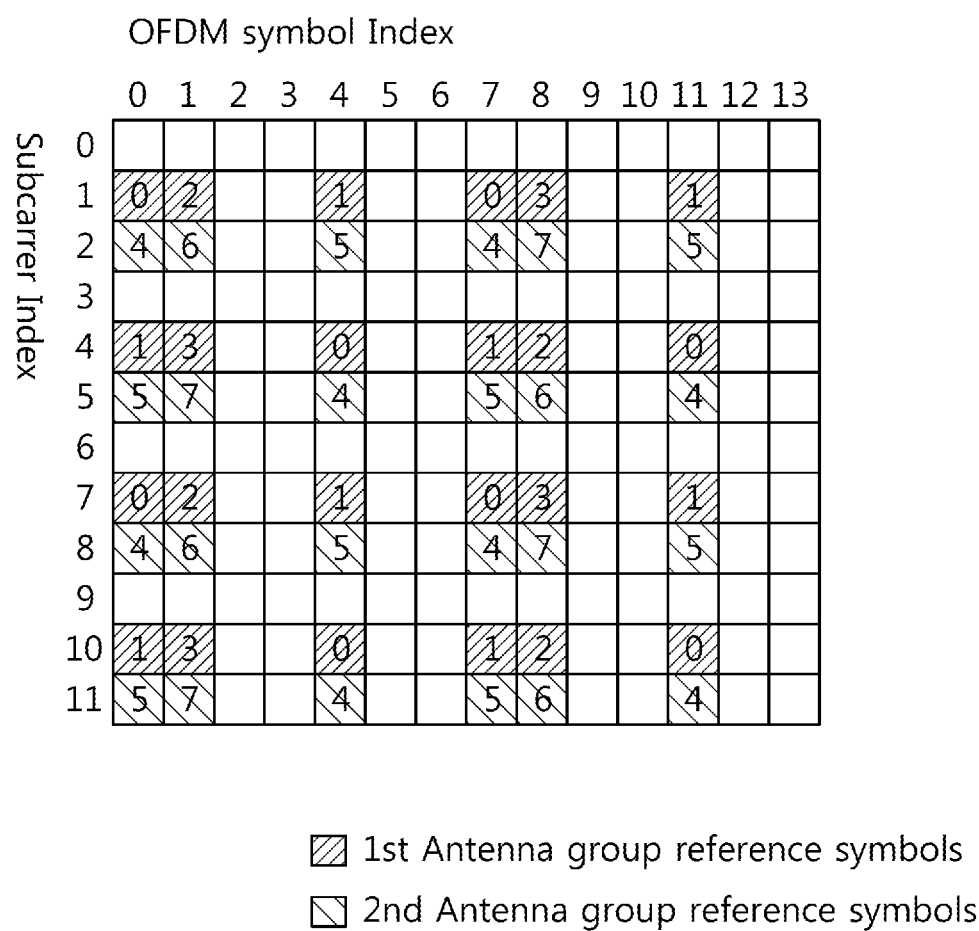
FIG. 15 shows an example of an RS structure in a system using eight transmit (Tx) antennas.

FIG. 15 shows an example of an RS structure in a system using eight Tx antennas.

Referring to FIG. 15, RSs 0 to 3 corresponding to antennas of the legacy system are mapped to reference symbols of a first antenna group, and RSs 4 to 7 corresponding to antennas of the evolved system are mapped to reference symbols of a second antenna group.

Hereinafter, the first antenna group includes antennas of the 4Tx system, and the second antenna group includes the remaining antennas of the 8Tx system other than the first antenna group. The RSs of the first antenna group consist of RSs corresponding to the respective antennas included in the first antenna group. The RSs of the second antenna group consist of RSs corresponding to the respective antennas included in the second antenna group. The RSs of the second antenna group may be used as RSs for another 4Tx system other than the RSs of the first antenna group. An RS N denotes an RS corresponding to an $N^{th}$ antenna.

The RSs of the first antenna group may be arranged according to an RS arrangement method of the legacy system as shown in FIG. 11. The RSs of the second antenna group may be arranged in REs adjacent to REs to which the RSs of the first antenna group are arranged. This is a pattern in which an RS of the evolved system is simply extended according to the RS structure of the legacy system.

Now, a method of transmitting Tx power information of an RS and data in an RS structure of various configurations.

Figure 16:
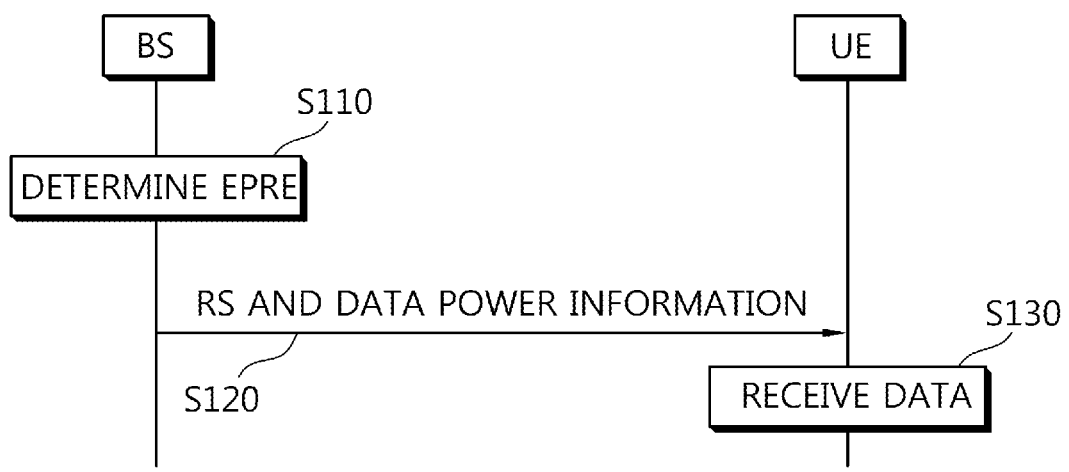
FIG. 16 shows an example of a method of transmitting Tx power information of an RS or data.

FIG. 16 shows an example of a method of transmitting Tx power information of an RS or data.

Referring to FIG. 16, a BS determines energy per resource element (EPRE) for downlink transmission (step S110). The EPRE denotes energy or Tx power for an RE to which one reference symbol or data symbol is mapped. The BS determines a UE-specific parameter and a cell-specific parameter to report the Tx power for the RS and the data to a UE. The RS includes a cell-specific reference signal (CRS), a dedicated reference signal (DRS), a channel state indication/information reference signal (CSI-RS), etc. The UE-specific parameter and the cell-specific parameter for reporting the Tx power for the RS and the data will be described below.

The BS reports power information of the RS and the data to the UE (step S120). The power information of the RS and the data include the UE-specific parameter and the cell-specific parameter for reporting the Tx power for the RS and the data. That is, the BS reports the determined UE-specific parameter and cell-specific parameter to the UE. The UE-specific parameter and the cell-specific parameter may be transmitted by using signaling of a higher layer such as an MAC layer or an RRC layer.

The UE receives data by using the power information of the RS and the data (step S130).

The UE may assume that cell-specific RS EPRE is constant across a downlink system bandwidth. The UE may assume that the cell-specific RS EPRE is constant across all subframes until different cell-specific RS power information is received. The downlink RS EPRE may be derived from downlink RS Tx power given by an RS power parameter provided by the higher layer. The downlink RS Tx power may be defined as a linear average over the power contributions of all REs that carry cell-specific RSs within a system bandwidth.

A ratio of PDSCH EPRE to cell-specific RS EPRE among PDSCH REs for each OFDM symbol can be denoted by $\rho_A$ or $\rho_B$. $\rho_A$ or $\rho_B$ is the UE-specific parameter, and can be determined according to an OFDM symbol index.

Table 1 shows an example of the OFDM symbol index denoted by $\rho_A$ or $\rho_B$ which is the ratio of the corresponding PDSCH EPRE to the cell-specific RS EPRE within one slot.

TABLE 1

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

The UE may assume 16 quadrature amplitude modulation (QAM), 64 QAM, spatial multiplexing, or PDSCH transmission associated with the multi-user MIMO transmission mode. $\rho_A$ may be equal to $\delta_{power-offset}+P_A[dB]$. Alternatively, when the UE receives PDSCH data using precoding for transmit diversity through 4 cell-specific antenna ports, $\rho_A$ may be equal to $\delta_{power-offset}+P_A+10 \log_{10}(2)[dB]$. Herein, $\beta_{power-offset}$ may be 0 dB in all transmission modes other than the multi-user MIMO. $P_A$ is the UE-specific parameter provided by the higher layer.

If UE-specific RSs are present in a physical resource block (PRB), the ratio of PDSCH EPRE to RS EPRE is identical for each OFDM symbol. The UE may assume that this ratio is 0 dB when using 16 QAM or 64 QAM.

A cell-specific ratio $\rho_B/\rho_A$ may be determined according to a cell-specific parameter $P_B$ signaled by the higher layer and the number of cell-specific antenna ports of the BS. Table 2 shows an example of the cell-specific ratio $\rho_B/\rho_A$ for the cell-specific antenna ports.

TABLE 2

| | $\rho_B/\rho_A$ | |
|---|---|---|
| $P_B$ | One antenna port | Two and four antenna ports |
| 0 | 1 | 5/4 |
| 1 | 4/5 | 1 |
| 2 | 3/5 | 3/4 |
| 3 | 2/5 | 1/2 |

The cell-specific parameter $P_B$ may be given by an integer number in the range of 0 to 3. In this case, RS power may be given by an integer number in the range of −60 to 50. The UE-specific parameter $P_A$ may be enumerated as dB-6, dB-4 dot77, dB-3, dB-1dot77, dB0, dB1, dB2, dB3, etc.

Cell-specific RS power has a cell-specific value (i.e., constant across the downlink bandwidth), and data power has a UE-specific value. The RS power may be given by an integer value, and the data power may be denoted by a RS power ratio. The data power is classified into two types, i.e., PDSCH power for an OFDM symbol without an RS and PDSCH power for an OFDM symbol with the RS. The RS power may be denoted by an integer value in the range of −60 to 50. The data power may be denoted by Equation 7.

$$\rho_A = P_{Data-NRS}/P_{CRS}$$

$$\rho_B = P_{Data-RS}/P_{CRS} \quad \text{[Equation 7]}$$

Herein, $P_{Data-NRS}$ is PDSCH EPRE for the OFDM symbol without the RS, and $P_{Data-NRS}$ is PDSCH EPRE for the OFDM symbol with the RS. $P_{CRS}$ cell-specific RS EPRE. That is, $\rho_A$ can be denoted by a ratio of the PDSCH EPRE for the OFDM symbol without the RS to the cell-specific RS EPRE. $\rho_B$ can be denoted by a ratio of the PDSCH EPRE for the OFDM symbol with the RS to the cell-specific RS EPRE. For data demodulation, a ratio of RS EPRE and data EPRE is important. In the OFDM symbol without the RS, the data-to-RS ratio $\rho_A$ may be given by higher layer signaling in a UE-specific manner. In the OFDM symbol with the RS, the data-to-RS ratio $\rho_B$ may be calculated by using $\rho_A$ which is given in a UE-specific manner and $P_B$ which is given in a cell-specific manner. That is, in an environment where the cell-specific RS is used, RS EPRE is a cell-specific value, and data EPRE is a UE-specific value.

Figure 17:
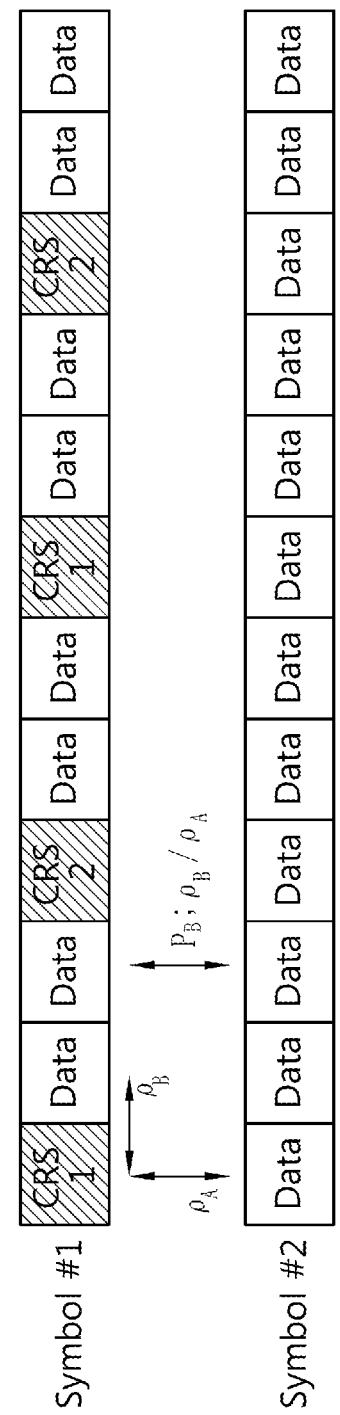
FIG. 17 shows an example of a structure of an orthogonal frequency division multiplexing (OFDM) symbol including an RS for expressing a user equipment (UE)-specific parameter and a cell-specific parameter to report Tx power for the RS and data and a structure of an OFDM symbol not including the RS.

FIG. 17 shows an example of a structure of an OFDM symbol including an RS for expressing a UE-specific parameter and a cell-specific parameter to report Tx power for the RS and data and a structure of an OFDM symbol not including the RS.

Referring to FIG. 17, a symbol #1 is the OFDM symbol including the RS, and a symbol #2 is the OFDM symbol not including the RS. A cell-specific RS (CRS) structure for 2 or 4 antenna ports is assumed herein. $\rho_A$ is denoted by a ratio of PDSCH EPRE for the symbol #2 to CRS EPRE. $\rho_B$ is denoted by a ratio of PDSCH EPRE for the symbol #1 to CRS EPRE. $P_B$ is denoted by a ratio of $\rho_B$ to $\rho_A$.

In the CRS structure for the 2 or 4 antenna ports, the OFDM symbol including the RS in one resource block may consist of 4 RS REs and 8 data REs. The 4 RS REs may be used by dividing them into 2 REs for any antenna and 2 REs for another antenna. According to a Tx antenna of the multiple antenna system in the OFDM symbol including the RS, increased energy may be given to an RE corresponding to a first RS (i.e., CRS1) for estimating a channel of a specific antenna in a certain antenna port and energy of 0 may be given to an RE of a second RS (i.e., CRS2) for estimating a channel of a different antenna. That is, energy for the RE for data or the first RS (i.e., CRS1) may be increased by the unused energy for the RE for the second RS (i.e., CRS2). Hereinafter, the first RS denotes an RS for channel estimation of an antenna in a specific antenna port, and the second RS denotes an RS for channel estimation of a different antenna.

Figure 18:
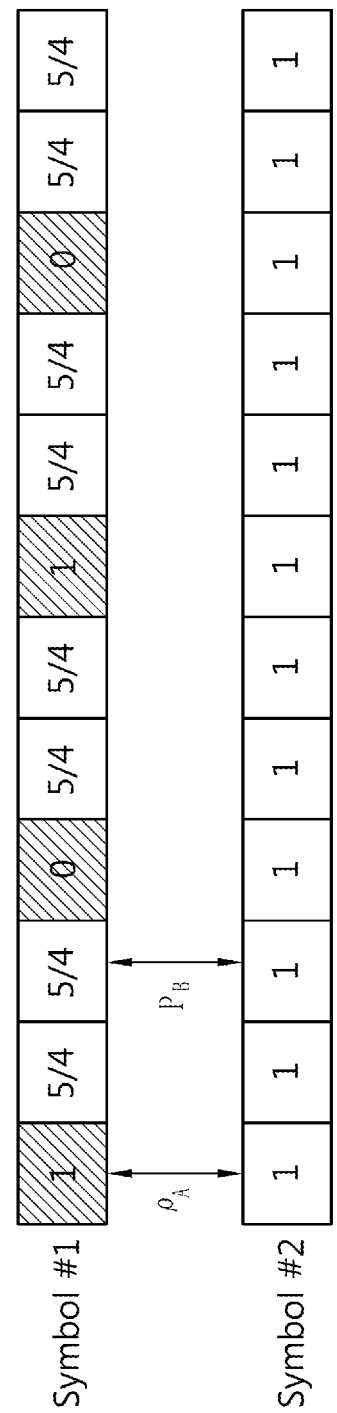
FIG. 18 shows an example of a structure of an OFDM symbol including an RS and a structure of an OFDM symbol not including the RS.

FIG. 18 shows an example of a structure of an OFDM symbol including an RS and a structure of an OFDM symbol not including the RS. In this case, $P_B=0$ ($\rho_B/\rho_A=5/4$) and $\rho_A=1(0 \text{ dB})$.

Referring to FIG. 18, a symbol #1 indicates an OFDM symbol including a cell-specific RS (CRS), and a symbol #2 indicates an OFDM symbol not including the RS. This may show a CRS structure for 2 or 4 antenna ports.

In the symbol #1, if energy for the CRS is 1, energy for a second RS may be decreased to 0 so that the unused energy for the second RS is used to increase energy for each of 4 data REs by ¼. Consequently, data RE energy may be 5/4. Therefore, a ratio of data EPRE for the symbol #1 to data EPRE for the symbol #2 is 5/4.

Figure 19:
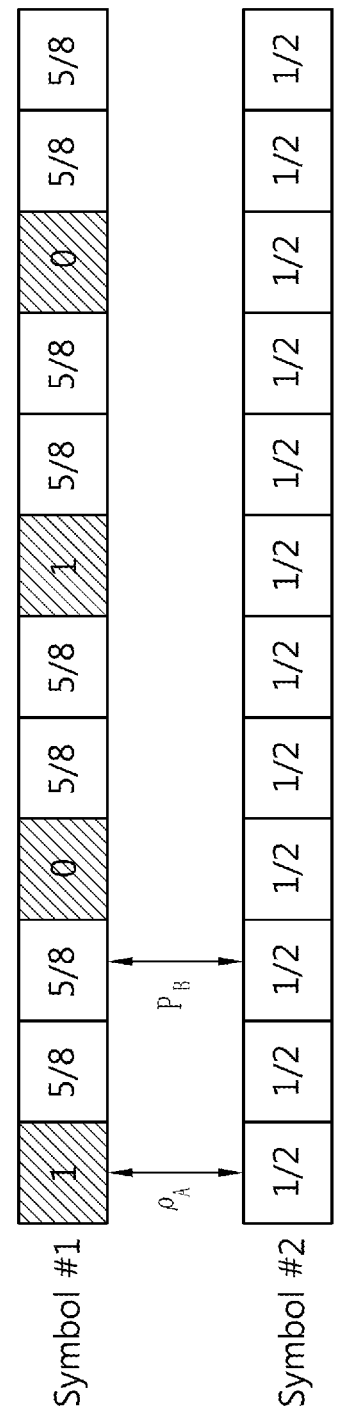
FIG. 19 shows another example of a structure of an OFDM symbol including an RS and a structure of an OFDM symbol not including the RS.

FIG. 19 shows another example of a structure of an OFDM symbol including an RS and a structure of an OFDM symbol not including the RS. In this case, $P_B=0$ ($\rho_B/\rho_A=5/4$) and $\rho_A=½(-3 \text{ dB})$.

Referring to FIG. 19, a symbol #1 indicates an OFDM symbol including a cell-specific RS (CRS), and a symbol #2 indicates an OFDM symbol not including the RS. This may show a CRS structure for 2 or 4 antenna ports.

In the symbol #1, if energy for the CRS is 1, energy for a second RS may be decreased to 0 so that the unused energy for the second RS is used to increase energy for a data RE. Consequently, the data RE energy may be 5/8. Therefore, a ratio of data EPRE for the symbol #1 to data EPRE for the symbol #2 is 5/4.

Figure 20:
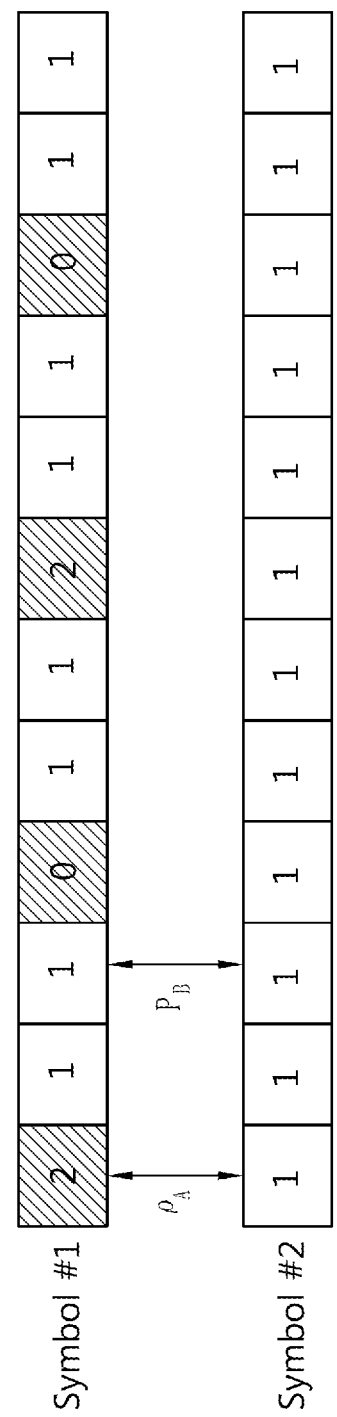
FIG. 20 shows another example of a structure of an OFDM symbol including an RS and a structure of an OFDM symbol not including the RS.

FIG. 20 shows another example of a structure of an OFDM symbol including an RS and a structure of an OFDM symbol not including the RS. In this case, $P_B=1$ $(\rho_B/\rho_A^{-1})$ and $\rho_A=\frac{1}{2}(-3\text{ dB})$.

Referring to FIG. 20, a symbol #1 indicates an OFDM symbol including a cell-specific RS (CRS), and a symbol #2 indicates an OFDM symbol not including the RS. This may show a CRS structure for 2 or 4 antenna ports.

In the symbol #1, energy for a second RS is used for transmission of a first RS, and EPRE for the first RS may have a value two times higher than data EPRE for the symbol #2. A ratio of data EPRE for the symbol #1 to data EPRE for the symbol #2 is 1.

Figure 21:
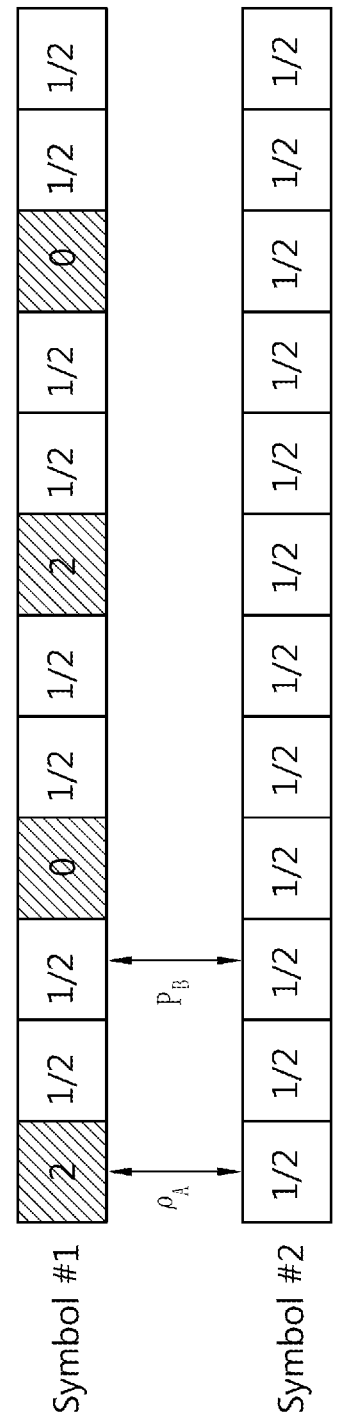
FIG. 21 shows another example of a structure of an OFDM symbol including an RS and a structure of an OFDM symbol not including the RS.

FIG. 21 shows another example of a structure of an OFDM symbol including an RS and a structure of an OFDM symbol not including the RS. In this case, $P_B-1$ $(\rho_B/\rho_A-1)$ and $\rho_A=\frac{1}{4}(-6\text{ dB})$.

Referring to FIG. 21, a symbol #1 indicates an OFDM symbol including a cell-specific RS (CRS), and a symbol #2 indicates an OFDM symbol not including the RS. This may show a CRS structure for 2 or 4 antenna ports.

In the symbol #1, energy for a second RS is used for transmission of a first RS, and EPRE for the first RS may have a value four times higher than data EPRE for the symbol #2. A ratio of data EPRE for the symbol #1 to data EPRE for the symbol #2 is 1.

Meanwhile, in a CRS structure for one antenna port, an OFDM symbol including an RS in one resource block may consist of 2 RS REs and 10 data REs. For RS power boosting, RS power may be increased by taking uniform power from 5 data REs. For example, if energy transmitted from each RE is 1, RS power may be increased by 3 dB by decreasing energy for each of 5 data REs by 1/5 and by increasing energy for an RS RE by 1. In this case, energy for data REs of the OFDM symbol including the RS is 4/5 whereas energy for data REs of the OFDM symbol not including the RS is still 1, and thus a ratio of data EPRE for the OFDM symbol including the RS to data EPRE for the OFDM symbol not including the RS can be denoted by '4/5'.

The CRS is transmitted for channel state measurement and data demodulation. To satisfy services for all UEs located in an inner cell and a cell edge, the RS power needs to be properly regulated. A function of the CRS may be performed distinctively for a channel state indication/information reference signal (CSI-RS) and a dedicated reference signal (DRS). In this case, power control needs to be properly performed on the CSI-RS and the DRS to obtain correct channel estimation performance.

The CSI-RS is an RS transmitted for channel state measurement, and may be mapped to a plurality of REs in a frequency domain. The CSI-RS may be mapped to a plurality of REs in at least one OFDM symbol. The CSI-RS may be mapped to REs in different positions for respective antenna ports in a multiple antenna system. There is no restriction on the number of REs allocated for the CSI-RS, a position of the RE, or the like in a resource block. CSI-RS power needs to be regulated so that a channel state can be properly estimated irrespective of a location of the UE in a cell. Therefore, there is a need for a method capable of reporting CSI-RS power information.

The DRS is a UE-specific RS used for data demodulation, and may also be referred to as a demodulation reference signal or a dedicated pilot. Since the DRS is the UE-specific RS, a precoding weight used for transmission of data for a specific UE may be equally applied to the DRS when transmission is performed. In this case, data demodulation is performed by using a channel estimated from the DRS. In general, DRS RE power may be equal to data RE power. However, DRS power may be set to higher than data power in order to increase channel estimation performance of the DRS. Therefore, there is a need for a method capable of reporting a power boosting level of the DRS.

Figure 22:
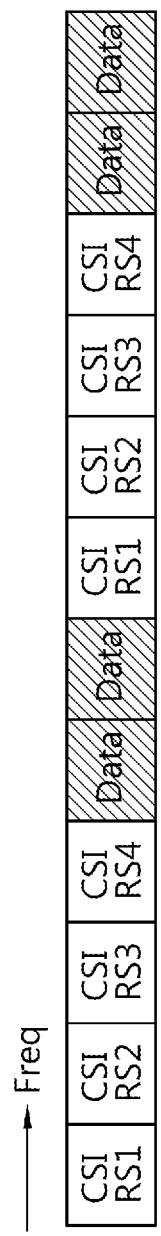
FIG. 22 shows an example of a structure of an OFDM symbol including a channel state indication/information reference signal (CSI-RS).

FIG. 22 shows an example of a structure of an OFDM symbol including a CSI-RS.

Referring to FIG. 22, a CSI-RS structure may be defined according to the number of RSs included in one OFDM symbol. That is, the CSI-RS structure may be determined according to the number of REs allocated for the CSI-RS in one OFDM symbol. For example, among 12 REs included in one OFDM symbol of one resource block, 8 REs may be used for the CSI-RS and the remaining 4 REs may be used for data. Although an OFDM symbol of one resource block is shown herein, the CSI-RS may be arranged across a full bandwidth. The position and the number of CSI-RS REs and the position and the number of data REs may be defined variously in the OFDM symbol, and there is no restriction thereon.

Hereinafter, a method of transmitting CSI-RS power information and data power information will be described under the assumption that, among the 12 REs included in one OFDM symbol, 8 REs are used for the CSI-RS and the remaining 4 REs are used for the data, and 4 REs for the CSI-RS are contiguous in a frequency domain and 2 REs for the data are contiguous in the frequency domain.

Figure 23:
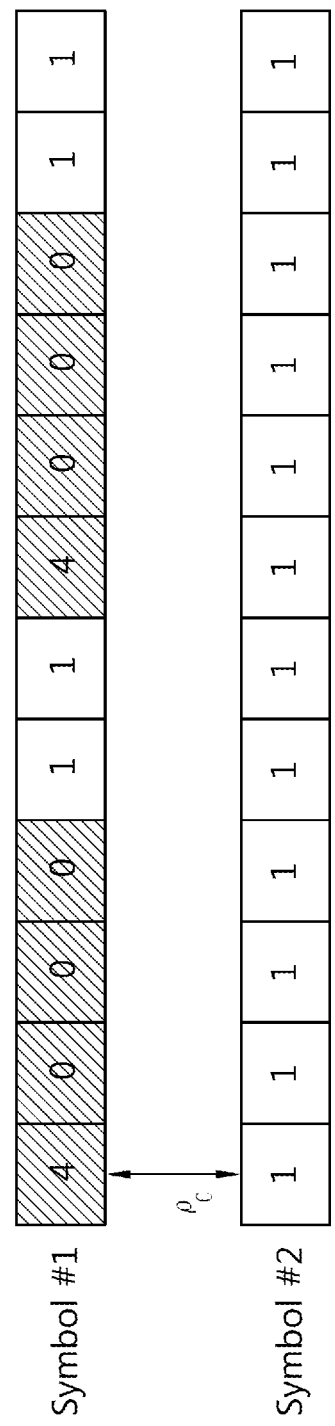
FIG. 23 shows an example of a structure of an OFDM symbol including an RS for transmitting power information of a CSI-RS and a structure of an OFDM symbol not including the RS.

FIG. 23 shows an example of a structure of an OFDM symbol including an RS for transmitting power information of a CSI-RS and a structure of an OFDM symbol not including the RS. A symbol #1 denotes an OFDM symbol including the CSI-RS, and a symbol #2 denotes an OFDM symbol on which only data is transmitted.

Referring to FIG. 23, in downlink transmission, a UE may estimate a channel quality indication (CQI) or channel state information (CSI) or the like by using channel information obtained using the RS. The UE reports the CQI, the CSI, or the like to a BS. On the basis of the report, the BS determines a modulation and coding scheme (MCS), a precoding weight matrix, or the like used for data transmission. In this case, power for an RE used for RS transmission may differ from power for an RE used for data transmission, and thus channel information obtained using the RS needs to be reconfigured according to a power level for data transmission.

CSI-RS power information may be denoted by a ratio of EPRE for an RE used for transmission of data in the symbol #2 and power for an RS inserted for CSI measurement. That is, the CSI-RS power information may be denoted by a ratio $\rho_C$ of data EPRE for the symbol #2 consisting of only data symbols to CSI-RS EPRE. This value may be reused for CRS EPRE and data EPRE. A UE may use a power ratio of an RE for data transmission and an RE for RS transmission to reconfigure channel information obtained by using the RS according to a power level for data transmission.

When the CSI-RS is transmitted from any antenna in a multiple antenna system, CSI-RS RE power for channel estimation of another antenna may be given to 0. That is, resource block may be defined for each antenna port in the multiple antenna system, and only a CSI-RS RE of a specific antenna may be used from CSI-RS REs while not using an RE for another antenna. For example, when the CSI-RS is present for 4 antennas, CSI-RS power for another antenna other than a CSI-RS RE for a specific antenna may be given to 0. To consistently adjust power for an OFDM symbol including the CSI-RS (i.e., a symbol #1) and an OFDM symbol not including the CSI-RS (i.e., a symbol #2), power for the transmitted CSI-RS and data may be regulated. In this case, the regulated CSI-RS power level may be denoted by a ratio with respect to data power for the symbol #2.

Equation 8 shows an example of CSI-RS power information denoted by the ratio $\rho_C$ of data EPRE to CSI-RS EPRE.

$$\rho_C = P_{Data\text{-}NRS}/P_{CSI\text{-}RS} \quad \text{[Equation 8]}$$

Herein, $P_{Data\text{-}NRS}$ denotes data EPRE for an OFDM symbol not including an RS, and $P_{CSI\text{-}RS}$ denotes CSI-RS EPRE. The ratio of data EPRE to CSI-RS EPRE may be defined to various values. For example, $\rho_C$ may have various values such as [−6 dB, −4.77 dB, −3 dB, −1.77 dB, 0 dB, 1 dB, 2 dB, 3 dB].

A ratio $\rho_A$ of data EPRE for an OFDM symbol not including an RS to CRS EPRE may be set to the same value as the ratio $\rho_C$ of data EPRE for an OFDM symbol not including the RS to CSI-RS EPRE. In this case, the ratio $\rho_C$ is equivalent to the ratio $\rho_A$, and CSI-RS power information may be indicated by $\rho_A$. The CSI-RS may be configured in a cell specific manner. In this case, the CSI-RS power information may be configured to a dynamic parameter included in a PDCCH for receiving control information by each UE so as to maintain a ratio of CSI-RS power and different UE-specific data RE power. Alternatively, the CSI-RS power information may be transmitted by a higher layer by using a UE-specific value $\rho_C$.

To reduce interference, a cell specific frequency shift of an RS may be used. The cell specific frequency shift is a method of transmitting the RS by shifting the RS to a position determined for each cell in a frequency domain. The cell specific frequency shift method may also apply to a CSI-RS. A cell specific time offset of the RS may also be used. That is, when the CSI-RS is transmitted in every n subframes, the CSI-RS may be set to have a different subframe offset for each cell, thereby avoiding inter-cell interference of the CSI-RS (where n is an integer satisfying n>0).

Figure 24:
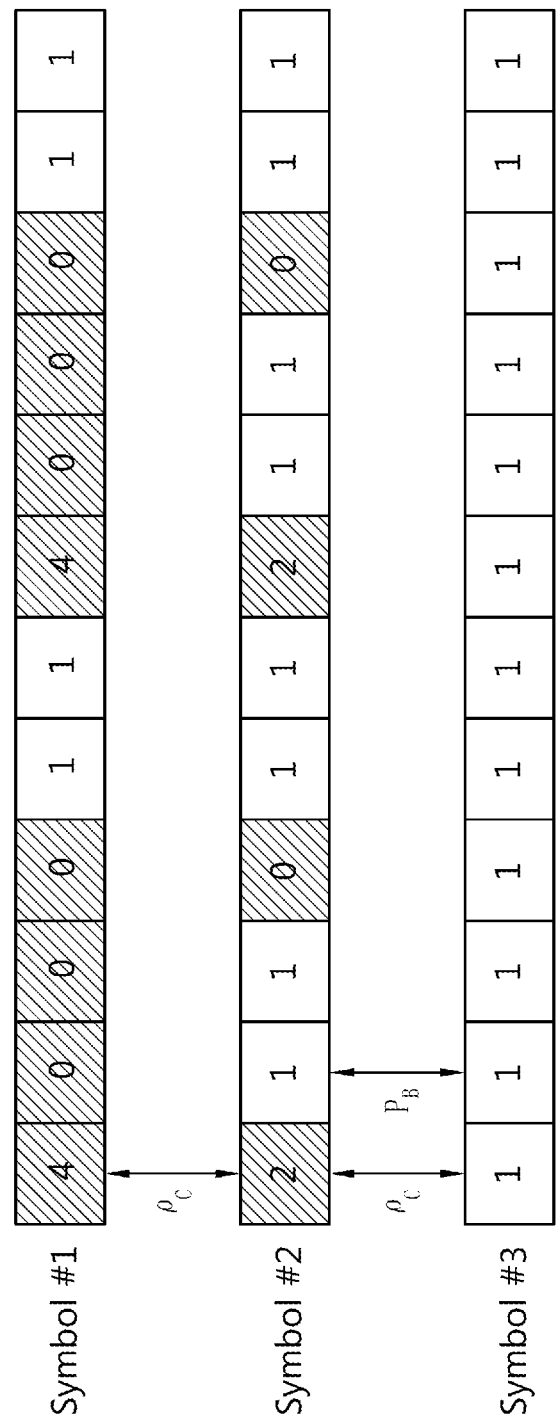
FIG. 24 shows another example of a structure of an OFDM symbol including an RS for transmitting CSI-RS power information and a structure of an OFDM symbol not including the RS.

FIG. 24 shows another example of a structure of an OFDM symbol including an RS for transmitting CSI-RS power information and a structure of an OFDM symbol not including the RS. A symbol #1 denotes an OFDM symbol including a CSI-RS. A symbol #2 is an OFDM symbol including a CRS as shown in FIG. 17. A symbol #3 denotes an OFDM symbol on which only data is transmitted.

Referring to FIG. 24, CSI-RS power information may be denoted by a ratio of power for the CRS of the symbol #2 and power for an RS inserted for CSI measurement. That is, the CSI-RS power information may be denoted by a ratio $\rho_C$ of CRS EPRE of the OFDM symbol including the CRS and CSI-RS EPRE. A parameter $\rho_A$ is used to denote a ratio of data EPRE to CRS EPRE, which may be used for CQI measurement or CSI measurement. When using the CSI-RS, a power ratio $\rho_C$ of the CRS and the CSI-RS may be defined, which may be used for CQI measurement or CSI measurement.

Equation 9 is an example of CSI-RS power information denoted by the ratio $\rho_C$ of CSI-RS EPRE to CRS EPRE.

$$\rho_C = P_{CSI\text{-}RS}/P_{CRS} \quad \text{[Equation 9]}$$

Herein, P CRS denotes CRS EPRE for the OFDM symbol including the CRS, and $P_{CSI\text{-}RS}$ denotes CSI-RS EPRE. $\rho_C$ may have various values such as [−6 dB, −4.77 dB, −3 dB, −1.77 dB, 0 dB, 1 dB, 2 dB, 3 dB].

Meanwhile, CRS power may always be set to the same value as CSI-RS power. In this case, CSI-RS power information may be reported by using CRS power information without signaling for the CSI-RS power information. Although it is described herein that the CSI-RS and the CRS are transmitted using different OFDM symbols, the CSI-RS and the CRS may be transmitted using the same OFDM symbol.

The CSI-RS power information may also be indicated by a predetermined integer value. For example, a CSI-RS power level may be set to an integer value in the range of −60 to 50.

CSI-RS power may be set according to a CRS power level. In this case, the CSI-RS power information may be indicated by using an overhead ratio of the CRS and the CSI-RS. The overhead ratio of the CRS and the CSI-RS may be denoted by an integer value. A ratio of a CSI-RS overhead for each antenna in a subframe to a CRS overhead for each antenna in the subframe may be added so that the CSI-RS power is equivalent to the CRS power. Alternatively, a power boosting level may be determined by using a constant offset in consideration of an overhead. The offset for determining the power boosting level may be broadcast by higher layer signaling.

Figure 25:
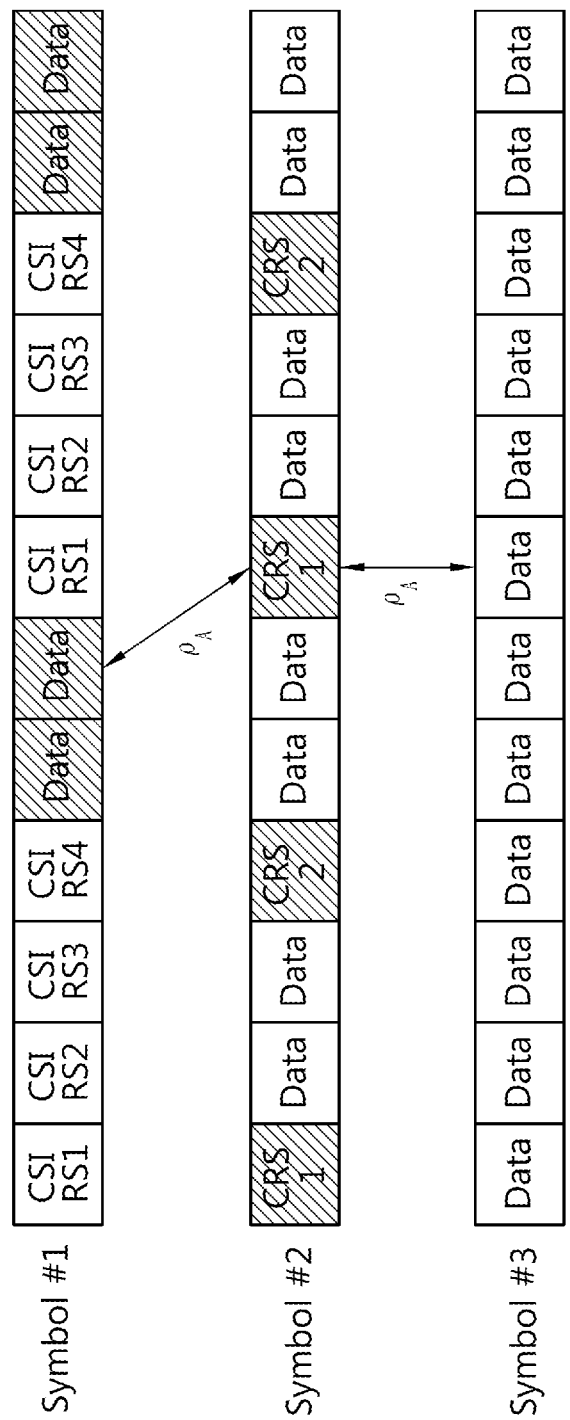
FIG. 25 shows an example of a structure of an OFDM symbol including an RS for transmitting power information of a data resource element (RE) of an OFDM symbol including a CSI-RS and a structure of an OFDM symbol not including the RS.

FIG. 25 shows an example of a structure of an OFDM symbol including an RS for transmitting power information of a data RE of an OFDM symbol including a CSI-RS and a structure of an OFDM symbol not including the RS. A symbol #1 denotes an OFDM symbol including a CSI-RS. A symbol #2 denotes an OFDM symbol including a CRS. A symbol #3 denotes an OFDM symbol on which only data is transmitted.

Referring to FIG. 25, EPRE for a data RE of the OFDM symbol including the CSI-RS may use $\rho_A$. That is, the EPRE for the data RE of the OFDM symbol including the CSI-RS may be determined according to a ratio of data EPRE for the OFDM symbol not including the RS to CRS EPRE. A CSI-RS may be inserted to an OFDM symbol period in which only data is included. Even if the CSI-RS is inserted, $\rho_A$ may be directly used. For example, when a ratio of data EPRE for the symbol #3 and CRS EPRE for the symbol #2 is denoted by $\rho_A$, even if the CSI-RS is inserted to the symbol #3 similarly to the symbol #1, the data EPRE for the symbol #1 may be directly indicated by $\rho_A$.

Figure 26:
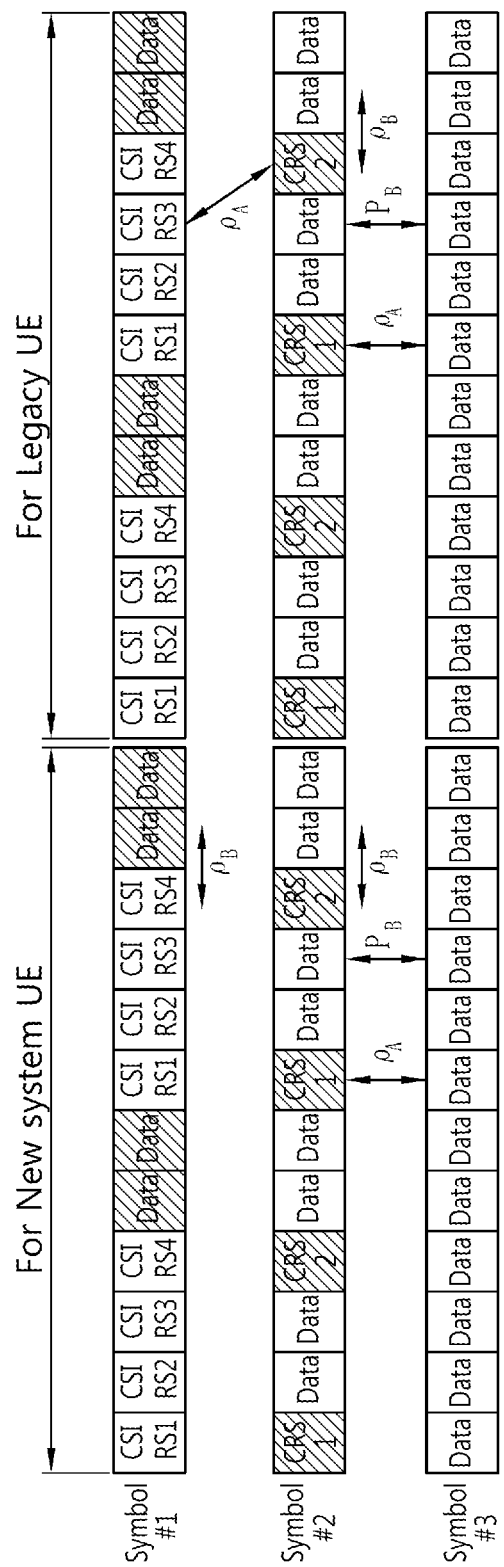
FIG. 26 shows another example of a structure of an OFDM symbol including an RS for transmitting power information of a data RE of an OFDM symbol including a CSI-RS and a structure of an OFDM symbol not including the RS.

FIG. 26 shows another example of a structure of an OFDM symbol including an RS for transmitting power information of a data RE of an OFDM symbol including a CSI-RS and a structure of an OFDM symbol not including the RS. A symbol #1 denotes an OFDM symbol including a CSI-RS. A symbol #2 denotes an OFDM symbol including a CRS. A symbol #3 denotes an OFDM symbol on which only data is transmitted.

Referring to FIG. 26, EPRE for a data RE of the OFDM symbol including the CSI-RS may use $\rho_B$. That is, the EPRE for the data RE of the OFDM symbol including the CSI-RS may be determined according to the ratio $\rho_B$ of data EPRE for the OFDM symbol including the RS to CRS EPRE.

Assume that a system using the CSI-RS and the CRS as RSs for channel measurement is a new system, and a system using only the CRS is a legacy system. The new system supports backward compatibility with respect to the legacy system. A UE of the new system is referred to as a new system UE. A UE of the legacy system is referred to as a legacy UE. The legacy UE may not know a CSI-RS position in the OFDM symbol including the CSI-RS whereas the new system UE may know the CSI-RS position.

When the OFDM symbol including the CSI-RS is transmitted, power for an RE of a resource block for the legacy UE may be defined with $\rho_A$. That is, in a resource block for the legacy UE, CSI-RS EPRE and data EPRE for the OFDM symbol including the CSI-RS may be determined according to the ratio $\rho_A$ of data EPRE for the OFDM symbol not including the RS to CRS EPRE. In a resource block for the new system UE, power for an RE for data transmission of the OFDM symbol including the CSI-RS may be defined with $\rho_B$. The new system UE conforms to a definition on CRS and CSI-RS positions in the OFDM symbol including the CRS to which $\rho_B$ is applied and in the OFDM symbol including the CSI-RS. The legacy UE conforms to a definition on a CRS position in the OFDM symbol including the CRS.

In the legacy system, $\rho_A$ indicates a ratio of data EPRE for the symbol #3 and CRS EPRE for the symbol. #2, and $P_B$ indicates data EPRE for the symbol #3 and data EPRE for the symbol #2. The UE may obtain a ratio of data EPRE for the symbol #2 and CRS EPRE for the symbol #2 by using the ratio $P_B$. In this case, a resource block allocated for the legacy UE in the OFDM symbol including the CSI-RS similarly to the symbol #1 may use $\rho_A$ to indicate EPRE for a data RE, and a resource block allocated for the new system UE may use $\rho_B$ to indicate EPRE for a data RE.

Figure 27:
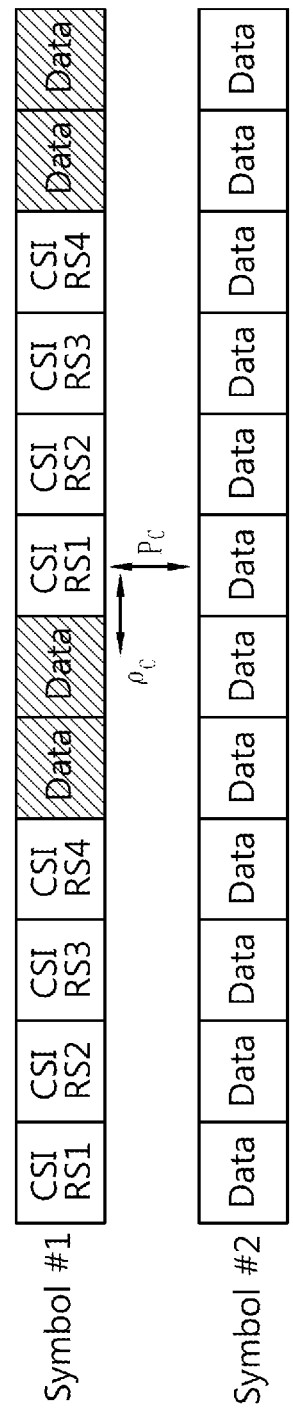
FIG. 27 shows another example of a structure of an OFDM symbol including an RS for transmitting power information of a data RE of an OFDM symbol including a CSI-RS and a structure of an OFDM symbol not including the RS.

FIG. 27 shows another example of a structure of an OFDM symbol including an RS for transmitting power information of a data RE of an OFDM symbol including a CSI-RS and a structure of an OFDM symbol not including the RS. A symbol #1 denotes an OFDM symbol including a CSI-RS. A symbol #2 denotes an OFDM symbol on which only data is transmitted.

Referring to FIG. 27, data EPRE for the OFDM symbol including the CSI-RS may be defined to $\rho_C$, and a ratio of $\rho_C$ to $\rho_A$ (i.e., $\rho_C/\rho_A$) may be defined to $P_C$. $P_C$ is a cell-specific parameter and may be transmitted by higher layer signaling. A UE may obtain $\rho_C$ by using $P_C$. Since $P_C$ is a value transmitted as the cell-specific parameter, and this value may be used in a receiver.

Indication on the CRS may be reused to denote either RS EPRE for the OFDM symbol including the CSI-RS or data EPRE. Since all UEs located in any region in a cell have to be able to perform proper channel estimation, a power level of an RS transmitted especially for channel state measurement is preferably transmitted as cell-specific information. The CRS has a cell-specific power level whereas EPRE for an RE used for data transmission of the UE has a UE-specific power level. Channel information estimated using the CRS may be used for CQI reporting or CSI measurement. Therefore, $\rho_A$ defined in the legacy system may be used to indicate a CSI-RS power level. Alternatively, the CSI-RS power level may be indicated by using only $P_A$ or by using a value defined with $P_A$ and any offset. A ratio of data EPRE for the OFDM symbol not including the RS to RS EPRE is defined to $\rho_A$. $\rho_A$ may be determined by $P_A$ which is a cell-specific value. $P_A$ may be transmitted by higher layer signaling. When using MU-MIMO or 4Tx transmit diversity schemes, $\rho_A$ may be defined by additionally considering a power offset. To indicate CSI-RS power, a relative power level with respect to the CRS power may be indicated. Alternatively, a CSI-RS power level may be indicated by an absolute power level.

Meanwhile, a power level indication mechanism for a CRS may be reused to indicate a power level of a dedicated reference signal (DRS). Alternatively, DRS power may be indicated by a relative power level with respect to CRS power. Alternatively, the DRS power level may be indicated by an absolute power level. When data demodulation is performed by using the DRS, a relation between a data RE and a CRS RE has no meaning in a new system. In this case, a relation between a DRS RE and the data RE has a meaning. That is, a value $P_A$ or $P_B$ transmitted to a UE may have no meaning in the new system, and this value may be used by defining it as a ratio of power for the data RE to power for the CRS RE. That is, one of the values $P_A$ and $P_B$ may be defined to a ratio of power for the DRS RE to power for the data RE of the OFDM symbol including the DRS, and the other value may be defined to a ratio of power for the data RE of the OFDM symbol not including the DRS to power for the data RE of the OFDM symbol including the DRS. A DRS power level may be indicated by defining a ratio of DRS EPRE to data EPRE for the OFDM symbol not including the DRS. Alternatively, the DRS power level may be indicated by a specific value.

According to the present invention, information on transmit power can be effectively transmitted in a reference signal structure of various configurations.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting power information in a wireless communication system, the method comprising:
    determining energy per resource element (RE) to which a reference signal or data is mapped for downlink transmission; and
    transmitting power information of the reference signal and the data,
    wherein the reference signal comprises a channel state indication-reference signal (CSI-RS) for channel state measurement,
    power information of the CSI-RS is denoted by $P_{Data\text{-}NRS}/P_{CSI\text{-}RS}$ or $P_{CSI\text{-}RS}/P_{CRS}$, and the power information of the data included in an orthogonal frequency division multiplexing (OFDM) symbol including the CSI-RS is denoted by $P_{DATA\text{-}NRS}/P_{CRS}$, wherein $P_{DATA\text{-}NRS}$ is a power for a data resource element (data RE) for an OFDM symbol on which only data is transmitted, $P_{CSI\text{-}RS}$ is a power for a CSI-RS resource element (CSI-RS RE), and $P_{CRS}$ is a power for a cell-specific reference signal resource element (CRS RE) used for channel state measurement and data demodulation.

2. The method of claim 1, wherein the ratio of the power for the CSI-RS RE and the power for the data RE is determined to be equal to the ratio of the power for the CRS RE and the power for the data RE for the OFDM symbol on which only the data is transmitted.

3. The method of claim 1, wherein the power information of the CSI-RS is indicated by a predetermined integer value.

4. The method of claim 1, wherein the power information of the CSI-RS is transmitted by higher-layer signaling.

5. The method of claim 1, wherein the CSI-RS is transmitted by being shifted to a position determined in a frequency domain.

6. The method of claim 1, wherein the CSI-RS is transmitted with a subframe offset different for each cell.

7. The method of claim 1, wherein the power information of the data included in an OFDM symbol including the CSI-RS is indicated by a parameter indicating the ratio of the power for the CSI-RS RE and the power for the data RE of the OFDM symbol on which only the data is transmitted and the ratio of the power for the CRS RE and the power for the data RE for the OFDM symbol on which only the data is transmitted.

8. The method of claim 1, wherein the power information of the data included in the OFDM symbol including the CSI-RS is transmitted by higher-layer signaling.

9. A method of transmitting power information in a wireless communication system, the method comprising:
    determining energy per resource element (RE) to which a reference signal or data is mapped for downlink transmission; and
    transmitting power information of the reference signal and the data, wherein the reference signal comprises a channel state indication-reference signal (CSI-RS) for channel state measurement, power information of the CSI-RS is denoted by $$P_{Data\text{-}NRS}/P_{CSI\text{-}RS} \text{ or } P_{CSR\text{-}RS}/P_{CRS},\text{ and}$$

the power information of the data included in an orthogonal frequency division multiplexing (OFDM) symbol including the CSI-RS is denoted by $$P_{DATA\text{-}RS}/P_{CRS},$$

wherein $P_{DATA\text{-}NRS}$ is a power for a data resource element (data RE) for an OFDM symbol on which only data is transmitted, $P_{DATA\text{-}RS}$ is a power for a data RE included in an OFDM symbol including a cell-specific specific reference signal (CRS), $P_{CSI\text{-}RS}$ is a power for a CSI-RS resource element (CSI-RS RE), and $P_{CRS}$ is a power for a cell-specific reference signal resource element (CRS RE) used for channel state measurement and data demodulation.

* * * * *